US00RE35456E

United States Patent [19]

Yassa et al.

[11] E Patent Number: Re. 35,456

[45] Reissued Date of Patent: Feb. 18, 1997

[54] FLUOROSCOPIC METHOD WITH REDUCED X-RAY DOSAGE

[75] Inventors: Fathy F. Yassa, Tencin, France; Aiman A. Abdel-Malek, Schenectady, N.Y.; John J. Bloomer, Schenectady, N.Y.; Chukka Srinivas, Schenectady, N.Y.

[73] Assignee: General Electric Company, Schenectady, N.Y.

[21] Appl. No.: 272,067

[22] Filed: Jul. 8, 1994

Related U.S. Patent Documents

Reissue of:

[64] Patent No.: 5,224,141
Issued: Jun. 29, 1993
Appl. No.: 810,341
Filed: Dec. 9, 1991

U.S. Applications:

[63] Continuation-in-part of Ser. No. 651,074, Feb. 6, 1991, abandoned.

[51] Int. Cl.[6] ..... H05G 1/64

[52] U.S. Cl. ..... 378/98.2; 378/98.7

[58] Field of Search ..... 378/98, 98.5, 98.7, 378/98.12, 94, 95, 96, 98.2, 98.3, 901; 364/413.16, 413.18

[56] References Cited

U.S. PATENT DOCUMENTS

| | | | |
|---|---|---|---|
| 3,745,245 | 7/1973 | Yunde et al. | 378/98.2 |
| 4,555,728 | 11/1985 | Fenster et al. | 378/98.2 |
| 4,644,398 | 2/1987 | Shimoni | 378/98.2 |
| 4,905,264 | 2/1990 | Ogura | 378/98.2 |
| 5,084,912 | 1/1992 | Barr | 378/98.2 |

FOREIGN PATENT DOCUMENTS

| | | |
|---|---|---|
| 0322956 | 7/1989 | European Pat. Off. . |
| 0389835 | 10/1990 | European Pat. Off. . |
| 59-231985 | 12/1984 | Japan . |
| 61-227488 | 9/1986 | Japan . |

OTHER PUBLICATIONS

Abdel-Malek et al., "Image Segmentation Via Motion Vector Estimates", SPIE Medical Imaging IV: Image Processing, vol. 1233, Feb. 6, 1990, Bellingham, Washington, pp. 366–371.

*Primary Examiner*—Don Wong
*Attorney, Agent, or Firm*—Marvin Snyder

[57] ABSTRACT

A method of fluoroscopically observing a living creature with reduced x-ray dosage is usable with a video monitor for displaying frames of image samples received during respective ones of frame scan intervals that regularly and successively occur at a display frame rate sufficiently high that brightness flicker is acceptably low to a human observer; an x-ray source that can be gated on for intervals not as long as a display frame; a fluoroscopic camera, including a raster-scanning video camera and a x-ray-to-light conversion apparatus with persistence not appreciably longer than a display frame; and frame filling apparatus for grabbing frames of image samples and interpolating between successively grabbed frames of image samples, when necessary, to generate frames of image samples at said display frame rate. During ones of said successive frame scan intervals, x-ray radiation is directed from the gated x-ray source through the living creature; the x-ray shadow of at least a portion of the living creature is viewed with the fluoroscopic camera; and the frame filling apparatus grabs frames of image samples from the raster-scanning video camera to be stored in frame stores and used as bases from which to compute fill frames of image samples. The frame filling apparatus continuously supplies to the video monitor the frames of image samples it generates at display frame rate.

12 Claims, 15 Drawing Sheets

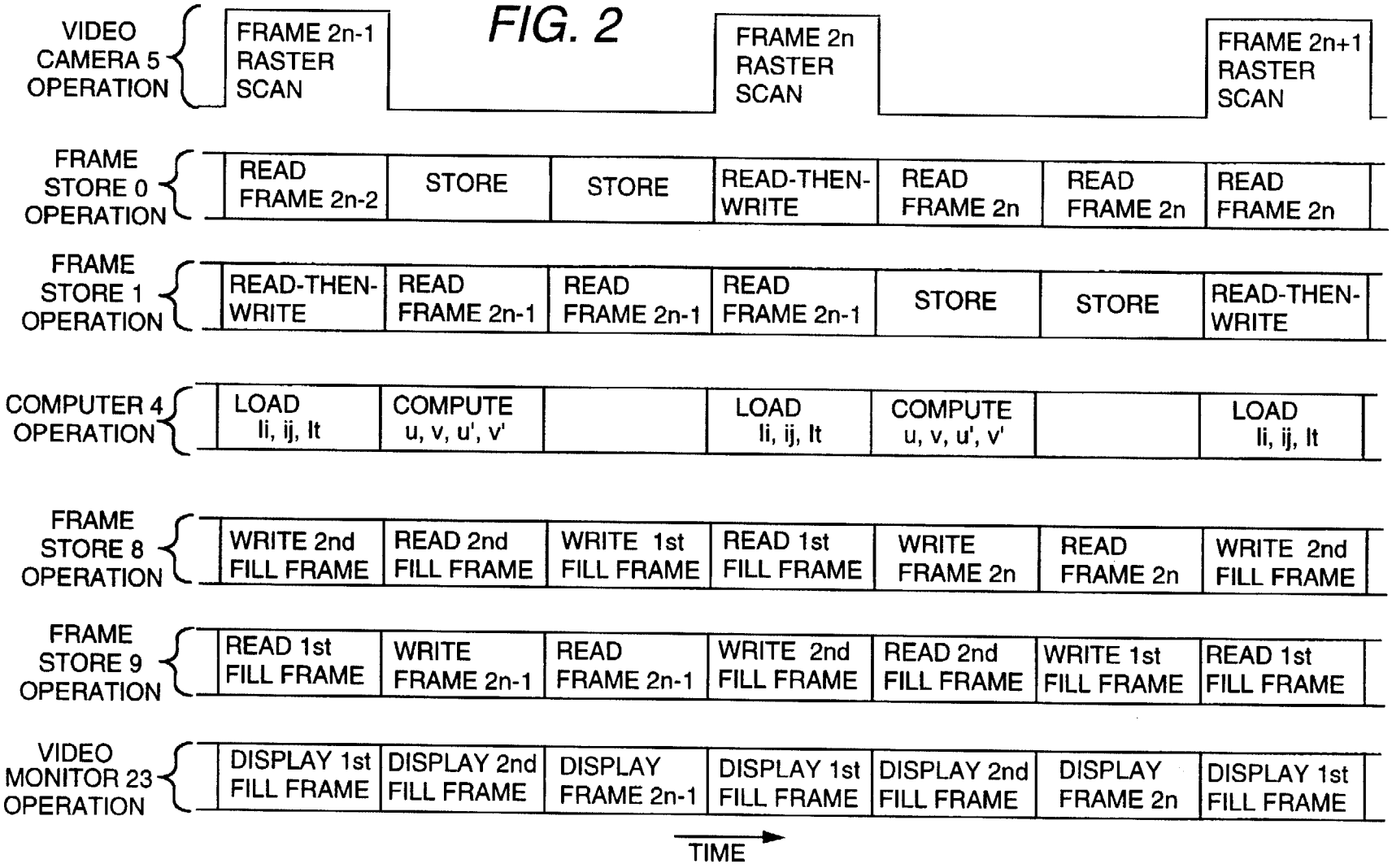
FIG. 2
VIDEO CAMERA 5 OPERATION
FRAME 2n-1 RASTER SCAN
FRAME 2n RASTER SCAN
FRAME 2n+1 RASTER SCAN
FRAME STORE 0 OPERATION
READ FRAME 2n-2
STORE
READ-THEN-WRITE
READ FRAME 2n
READ FRAME 2n
FRAME STORE 1 OPERATION
READ-THEN-WRITE
READ FRAME 2n-1
READ FRAME 2n-1
STORE
STORE
READ-THEN-WRITE
COMPUTER 4 OPERATION
LOAD Ii, ij, It
COMPUTE u, v, u', v'
LOAD Ii, ij, It
COMPUTE u, v, u', v'
LOAD Ii, ij, It
FRAME STORE 8 OPERATION
WRITE 2nd FILL FRAME
READ 2nd FILL FRAME
WRITE 1st FILL FRAME
READ 1st FILL FRAME
WRITE FRAME 2n
READ FRAME 2n
WRITE 2nd FILL FRAME
FRAME STORE 9 OPERATION
READ 1st FILL FRAME
WRITE FRAME 2n-1
READ FRAME 2n-1
WRITE 2nd FILL FRAME
READ 2nd FILL FRAME
WRITE 1st FILL FRAME
READ 1st FILL FRAME
VIDEO MONITOR 23 OPERATION
DISPLAY 1st FILL FRAME
DISPLAY 2nd FILL FRAME
DISPLAY FRAME 2n-1
DISPLAY 1st FILL FRAME
DISPLAY 2nd FILL FRAME
DISPLAY FRAME 2n
DISPLAY 1st FILL FRAME
TIME

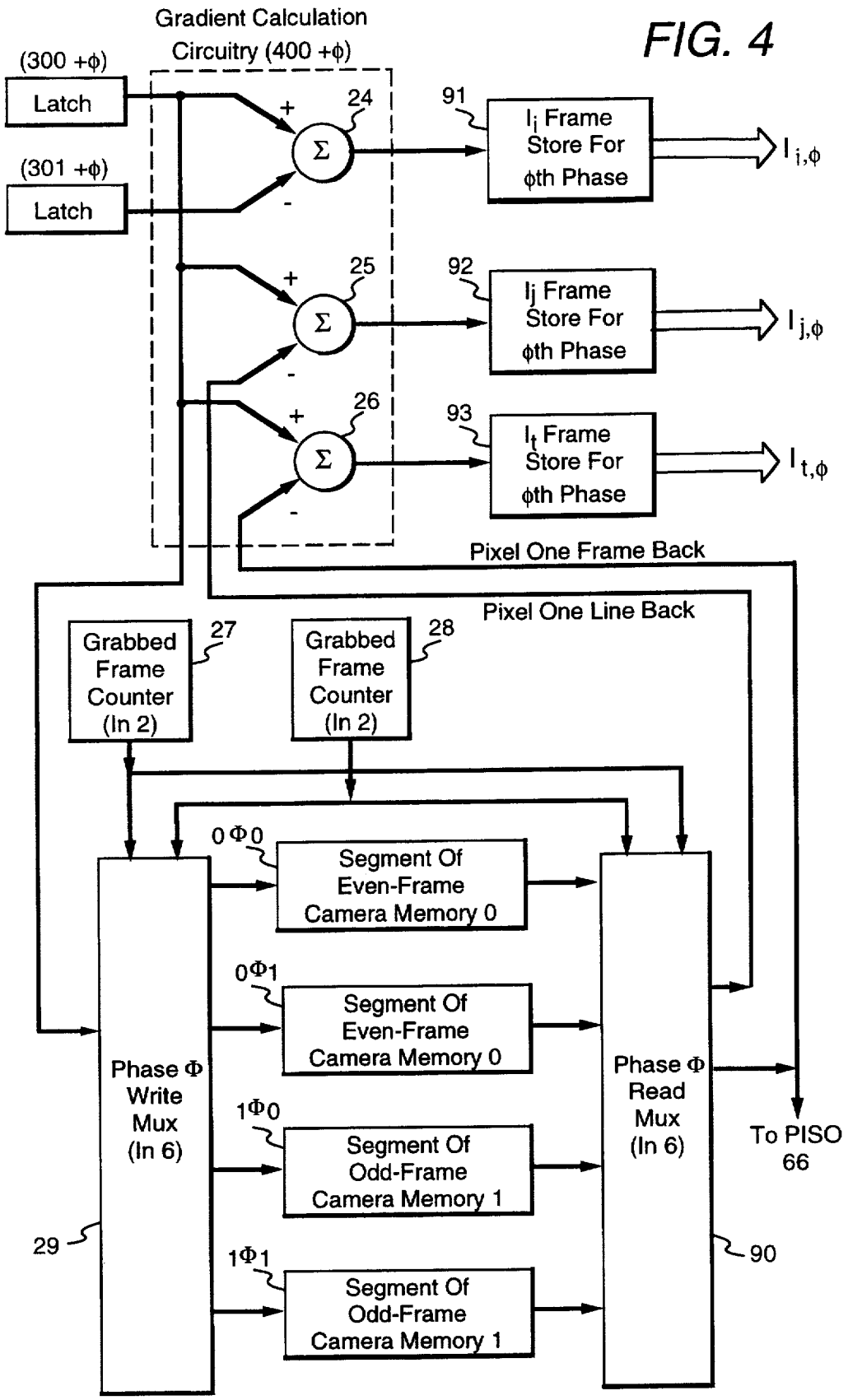
FIG. 4
Gradient Calculation Circuitry (400 +ϕ)
(300 +ϕ)
Latch
(301 +ϕ)
Latch
24
25
26
91
92
93
Ii Frame Store For ϕth Phase
Ij Frame Store For ϕth Phase
It Frame Store For ϕth Phase
Ii,ϕ
Ij,ϕ
It,ϕ
Pixel One Frame Back
Pixel One Line Back
Grabbed Frame Counter (In 2)
27
Grabbed Frame Counter (In 2)
28
0Φ0
Segment Of Even-Frame Camera Memory 0
0Φ1
Segment Of Even-Frame Camera Memory 0
1Φ0
Segment Of Odd-Frame Camera Memory 1
1Φ1
Segment Of Odd-Frame Camera Memory 1
Phase Φ Write Mux (In 6)
29
Phase Φ Read Mux (In 6)
90
To PISO 66

FLUOROSCOPIC METHOD WITH REDUCED X-RAY DOSAGE

Matter enclosed in heavy brackets [ ] appears in the original patent but forms no part of this reissue specification; matter printed in italics indicates the additions made by reissue.

This is a continuation-in-part of application Ser. No. 07/651,074 filed Feb. 6, 1991, and now abandoned.

The invention relates to fluoroscopic imaging and, more particularly, to providing for the reduction of cumulative exposure to x-rays of a living creature that is being observed.

BACKGROUND OF THE INVENTION

Prior art fluoroscopic imaging systems use x-ray tubes that are intermittently powered by application of pulses thereto, which tubes generate the x-ray beams directed through the inwards of a living creature being observed to a screen of phosphorescent material or to any array of scintillators. The pattern of x-ray penetration through the creature being observed is thereby converted to a light pattern. Optics focus the light pattern to generate an image within a video camera. Each pulse of x-ray beams generates a respective image for the video cram, which image is scanned by the electronic camera device to generate a respective frame of video input signal for a video monitor. A video monitor is like a television receiver without the front end portions used to detect video signal from radio waves. The video monitor requires a prescribed regular frame rate for the video signals it receives if, as is the usual practice, the video monitor uses a kinescope with electromagnetic deflection and the electromagnetic deflection uses resonant energy recovery methods. The pulse rate for gating the x-ray tube into operation has been chosen high enough that the regular rate of frames generated by the electronic camera device is sufficiently high to avoid excessive flicker in the average brightness level of the visual display generated by the video monitor. The flicker in the average brightness level can be reduced by using longer-persistence phosphors in the viewing screen of the video monitor, but smear of moving objects becomes noticeable with long-persistence phosphors. The human observer is more sensitive to flicker at higher light levels, but when using normal-persistence kinescope phosphors a 60 Hz flicker rate is deemed to be unobjectionable at normal room light levels when viewing broadcast television (which is raster scanned interlacing the scan lines of alternate fields). Somewhat more display flicker is tolerated in fluoroscopy than in broadcast television, progressive scanning at 30 Hz frame rate being a customary practice in fluoroscopy employing a video camera. The display frame rate is a fixed rate to accommodate resonant energy recovery in the electromagnetic deflection circuitry for the kinescope in the video monitor.

It is known in the prior art that the introduction of a frame storage device between the electronic camera device and the video monitor can avoid x-ray exposures having to be made at the display frame rate in order that the electronic camera device can generate consecutive frames of image samples for the video monitor at a display frame rate high enough to avoid flicker in the average brightness level of the video monitor. Each frame of video camera samples generated during a respective one of less frequent x-ray exposures is written to the frame store in a procedure called "frame grabbing". The writing of the frame store is performed in synchronism with the raster scanning of the video camera, during which frame the image samples are supplied directly to the video monitor. The frame of image samples stored in the frame store can then be repeatedly raster scanned to supply repeated frames of image samples until an updating frame of image samples is available from the video camera responsive to the next x-ray exposure.

Accordingly, the use of the frame store facilitates lowering on average the pulse rate of gating the x-ray tube into operation, which reduces the dosage of x-rays to which the living creature being observed is exposed over a given period of time. With the use of the frame store, the reduction of this pulse rate is limited by the tolerance of a human observer to motion flicker, or the stroboscopic effect of reduced field rate, in the video display on the video monitor screen. Motion flicker becomes more noticeable as motion becomes faster, so the degree of reduction of the pulse rate for gating the x-ray tube operation is limited as a function of the rate of motion in the portion of the inwards of the living creature being fluoroscoped. Accordingly, in practicing their method of x-ray dose reduction, the inventors make available a range of pulse rates that can be keyed to the nature of the organ(s) being observed by their fluoroscopic system.

The inventors rely on frame filling apparatus to reduce the motion flicker that occurs when the pulse rates for gating the x-ray tube are lowered, so that a greater reduction of the pulse rate for gating the x-ray tube can be tolerated and the average dose of radiation over a given time can be reduced still more. A. Abdel-Malek, O. Hasekioglu and John Bloomer describe a feasibility study they made with regard to reducing pulse rates for gating the x-ray tube in fluoroscopic apparatus in their paper "Image segmentation via motion vector estimates", SPIE Vol. 1233 Medical Imaging IV: Image Processing (1990), pp. 366–371, published 6 Feb. 1990. This feasibility study (incorporated herein by reference) found that acceleration-compensated interpolation techniques provided superior estimates of fill frames. The feasibility study was made processing sequences of recorded images in extended time. Arranging for frame-filling techniques to reduce the motion flicker that occurs when the pulse rates for gating the x-ray tube are lowered, which techniques meet the requirements that they be executed in real time, presented a substantial technical challenge.

SUMMARY OF THE INVENTION

A method for fluoroscopically observing a living creature with reduced x-ray dosage reduces the frequency at which successive x-ray images are obtained to be closer to the minimum rate at which motion is satisfactorily observable and uses frame filling apparatus to provide a video monitor with video information at a frame rate sufficiently high that excessive flicker of the average brightness of the display is avoided. The reduction in the frame rate may be done, taking into consideration both clinical needs and the speeds of motion of the organs being observed fluoroscopically. Mere observation of organ motion for diagnostic reasons may not have the speed of response requirements that observation of catheter insertion has, for example. For the observation of relatively slow-moving processes—such as peristalsis, for example—a lower frame rate may be selected than for relatively fast-moving processes—such as esophageal action, for example.

The reduction in the frame rate may be done in such manner that the frame rate is no longer uniform, but rather is more reduced during periods of lesser sample interest and is less reduced during periods of greater sample interest. The periods of greater and lesser sample interest are determined in variants of the inventors' method of analyzing the degree of change in successive x-ray images and increasing image rate when motion between frames becomes excessive; however, the reaction time needed for making such changes is too slow for certain types of fluoroscopic observations. Accordingly, in other variants of the inventors' method, the periods of greater and lesser sample interest are determined by recourse to auxiliary organ monitoring means—e.g., an electrocardiograph in the instance where the organ of interest is the heart or another portion of the circulatory system.

BRIEF DESCRIPTION OF THE DRAWING

FIG. 2 is a timing diagram of operation in the frame filling apparatus shown in FIG. 1.

FIG. 4 is a schematic diagram of the gradient calculation apparatus for one spatial phase.

DETAILED DESCRIPTION

Figure 1:
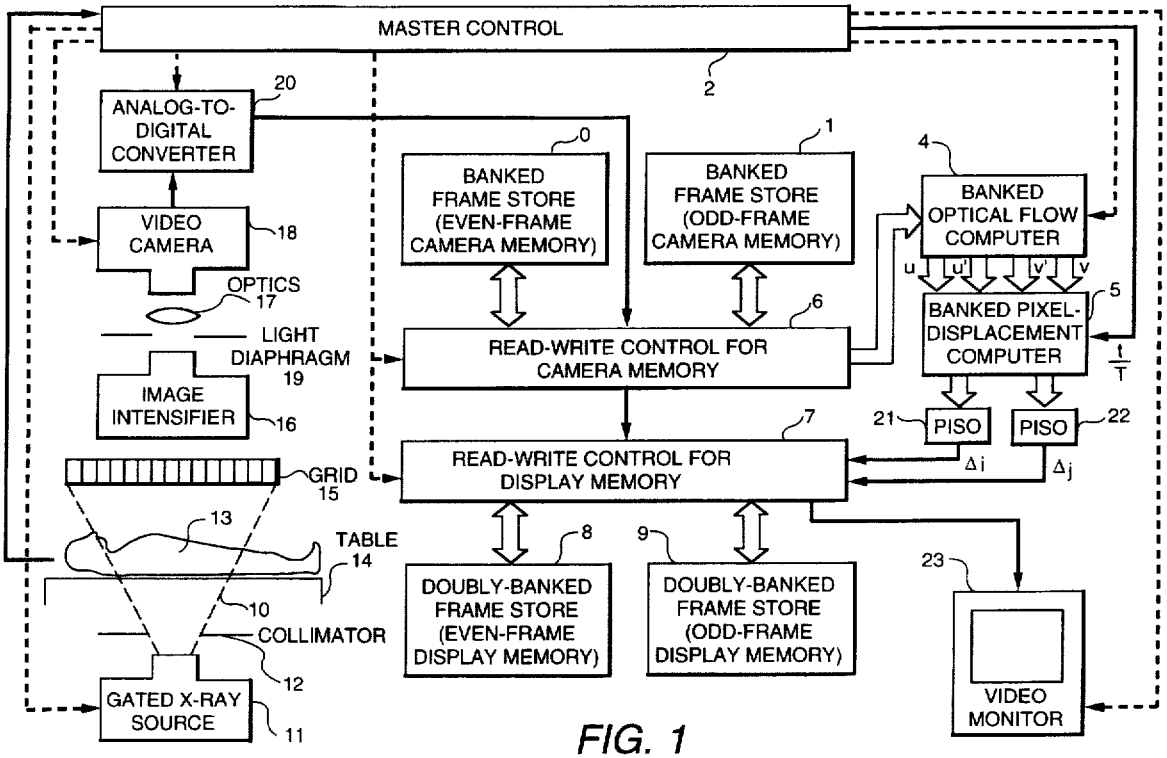
FIG. 1 is a schematic diagram of fluoroscopic apparatus arranged to operate at reduced image rate and to include frame filling apparatus, in order to implement the invented method.

The inventors' method for fluoroscopically observing a living creature with reduced x-ray dosage relies heavily on having suitable frame filling apparatus. Many of the frame filling apparatus designs known in the prior art are designed for communications systems in which the desire is to reduce the rate of data transmissions so that the transmissions can be made via media of reduced bandwidth. In such systems the possibility exists of segmenting images into changing and non-changing portions and, usually at the cost of increased sensitivity to noise encountered in the transmission process, transmitting information concerning only the changing portions of the image. The requirements on frame filling apparatus for fluoroscopic apparatus do not readily admit of segmenting images into changing and non-changing portions. The x-ray irradiation is by its nature broad-beam in nature and not capable of being tightly focussed so as to allow individual pixel scanning procedures. So, if an x-ray exposure is made, the fluoroscopic camera will generate an entire frame of new samples. Speckle effects are appreciable in the x-ray images, particularly when x-ray pulse energy is reduced by shortening the pulse. To reduce the visibility of the speckle effects on a video monitor, it is desirable that the observer's eye be able to integrate optically image samples from as many frames of camera samples as possible within its optical integration time constant.

As noted in the Abdel-Malek et alii paper "Image segmentation via motion vector estimates", at least for medical imaging, acceleration-compensated interpolation techniques provided estimates of fill frames superior to the linear interpolation techniques used in many prior-art frame filling apparatuses. It is desirable to minimize the number of frames of storage required in a frame filling apparatus, to reduce the complexity of the apparatus and the attendant increased likelihood of malfunction, and to reduce system power requirements, as well as to reduce system cost. Based on prior-art knowledge of frame filling procedures and on the ensuing specification descriptive of presently preferred frame filling apparatuses, those skilled in the art of closed-system television design should be able to design frame filling apparatuses alternative to those described below, which alternative apparatuses are adequate for carrying out the inventors' method for fluoroscopically observing a living creature with reduced x-ray dosage.

The frame filling apparatus specifically described below interpolates fill frames between pairs of previous camera-originated frames. Frame filling apparatus that extrapolates fill frames from previous single camera-originated frames is described in a U.S. patent application Ser. No. 07/805,2448 filed concurrently herewith by J. J. Bloomer, A. A. Abdel-Malek and F. F. Yassa and entitled "FLUOROSCOPIC IMAGER WITH FRAME-FILLING APPARATUS". The entirety of U.S. patent application Ser. No. 07/805,248 is incorporated by reference in the disclosure of this application. Frame filling apparatus that extrapolates fill frames from previous single camera-originated frames is currently preferred by the inventors over frame filling apparatus which interpolates fill frames between pairs of previous camera-originated frames, for carrying out the methods of their invention. A reason for this preference is the decreased latency time of the displayed image, which is desirable when the fluoroscopic observations are of a procedure performed by the observer—e.g., the insertion of a catheter into the heart. Where the fluoroscopic observations are used solely for diagnosis, somewhat more accurate fill frames can be computed by interpolation between pairs of previous camera-originated frames.

FIG. 1 shows fluoroscopic apparatus for reducing the dosage of x-ray radiation 10 with which a gated x-ray source 11 with a collimator 12 irradiates a human being 13 lying on a table 14 transparent to the x-ray radiation 10. The x-ray illumination passes through the table 14 and the human being 13 (and optionally through a grid 15, which suppresses scattering) to an image intensifier tube 16, which has a screen of phosphorescent material or an array of scintillators that emits light. The image of the x-ray shadow of the irradiated portion of the human being 13 contained in this light emission is focused by optics 17 onto the photosensitive screen of a video camera 18. To avoid coma, the persistence of light emission from the screen of phosphorescent material or array of scintillators in the image intensifier 16 is not long as compared to the frame scan interval, and the x-ray source 11 is gated to supply a beam of x-ray radiation 10 that is pulsed for a duration shorter than the frame scan interval.

The video camera 18 is preferably a solid-state camera, such as one using a charge-coupled device (CCD) imager, so that the [rater] *raster* scanned samples in each image field are temporally aligned, rather than being skewed in time. The video camera 18 is also preferably of progressive-scanning type wherein each frame of video consists of samples from a single image field, this being preferred so the raster-scanned samples in each frame are temporally aligned. The intensity of the light transmitted to the video camera 18 is adjusted by a light diaphragm 19. The video camera 18 is assumed to raster scan the x-ray image at the display frame rate in the FIG. 1 fluoroscopic apparatus. Accordingly, the video camera 18 provides frames of raster-scanned x-ray image information in analog form to an analog-to-digital converter 20, which frames of raster-scanned x-ray image information are interspersed among frames of raster-scanned signal devoid of x-ray image information. The analog-to-digital converter 20 is preferably of the flash converter type and generates digital words representative of the image intensity $I_{(i,j,t)}$ at the picture elements (pixels) of the image. Master control circuitry 2 controls the gating of the x-ray source 11, the raster scanning by the video camera 18 and the sampling of the analog-to-digital converter 20, as well as controlling other functions, as will be presently described.

The motion of the brightness patterns on the image plane (i.e., the photosensitive screen of a video camera 18) is referred to as optical flow. Optical flow is conventionally defined as a displacement vector at each pixel of the image. Digital computations of optical flow proceeding from digital words representative of the image intensity are rather complex, not only involving a number of digital multiplication steps and a digital division step, but also requiring iterative computations steps. Consequently, with presently available technology, these computations are very difficult to carry out at a several times multiple of the rate at which pixel samples are supplied from the analog-to-digital converter 20. Accordingly, the computations are carried out on a polyphase basis using a plurality of spatial phases as mapped into the time domain. That is, the successive samples supplied from the analog-to-digital converter 20 are supplied to a time-division multiplexer 3 that separates the successive samples into a number of temporal phases corresponding to respective spatial phases in the direction parallel to scan lines in the video camera 18. Each of these spatial phases is supplied to a respective bank of a banked optical flow computer 4.

The optical flow computer 4 calculates the components u and v of a displacement velocity vector for each pixel. The component u of the displacement velocity vector is in the direction parallel to scan lines and the component v of the displacement velocity vector is in the direction transverse to scan lines. In a simple frame filling procedure using linear pixel interpolation, each pixel is displaced by u(t,T) and by v(t/T) in the direction transverse to scan lines each successive frame of fill. A frame filling procedure preferred by the inventors includes acceleration-compensated interpolation, so the optical flow computer 4 is shown in FIG. 1 as also computing u' and v', the derivatives with respect to time of u and v.

The nature of the computation of the orthogonal components u and v of a displacement velocity vector for each pixel in the optical flow computer 4 will now be briefly described. Let I(i,j,t) be the irradiance of the image at point (i,j) and time t, and u(i,j) and v(i,j) be the optical flow (or displacement velocity) components in the i and j directions, respectively. An optical flow constraint equation can be derived using the assumption that the irradiance will be the same at point (i+δi,j+δj) at time t+δt. Hence, $$I(i+u\delta t,\ j+v\delta t)=I(i,j,t), \tag{1}$$

where $u\delta t=\delta i$ and $v\delta t=\delta j$, for small time intervals, δt. If the irradiance, I(i,j,t), is continuous almost everywhere and first order differentiable then, by expanding the left hand side, keeping the first order linear terms, and taking the limit as $\delta t\rightarrow 0$ we obtain, $$I_i u+I_j v+I_t=0, \tag{2}$$

where $I_i$, $I_j$, $I_t$ are the derivatives of the image intensity with respect to i, j, and t, respectively. This equation represents a constraint on the displacement velocity vector (u, v) and is referred to as an optical flow constraint equation. Basically, this equation indicates that the intensity of the corresponding point at the next image should be the same. It is impossible to calculate the optical flow field, (u, v), uniquely using equation (2) alone. Depending on the particular problem, additional constraints can be included. Smoothness constraint, which suggest the motion field varies smoothly, can be expressed as $$S(i,j)=u_i^2+u_j^2+v_i^2+v_j^2 \tag{3}$$

Combining these two constraints, the following object function is obtained:

$$L=\lambda\iint(I_i u+I_j v+I_t)^2 di\ dj+\iint u_i^2+u_j^2+v_i^2+v_j^2 di \tag{4}$$

where λ can be interpreted as a parameter that indicates the relative emphasis on the two components of the objective function. L(i,j) can be easily converted to discrete form by expressing the directional derivatives as first-order differences so that $$L(i,j) = \sum_i \sum_j 1/4\,(u_{i+1,j} - u_{i,j})^2 + (u_{i,j+1} - u_{i,j})^2 + (v_{i+1,j} - v_{i,j})^2 + (v_{i,j+1} - v_{i,j})^2 + \lambda\,(I_j\,u_{i,j} + I_j\,v_{i,j} + I_t)^2 \quad (5)$$

Differentiating equation (5) with respect to $u_{ij}$ and $v_{i,j}$ yields a linear set of equations which can be solved using Gauss-Seidel iteration:

$$u_{i,j}^{n+1} = \bar{u}_{i,j}^{n} - \frac{I_i\bar{u}_{i,j}^{n} + I_j\bar{v}_{i,j}^{n} + I_t}{1 + \lambda\,(I_i^2 + I_j^2)}\,I_i \quad (6)$$

$$v_{i,j}^{n+1} = \bar{v}_{i,j}^{n} - \frac{I_i\bar{u}_{i,j}^{n} + I_j\bar{v}_{i,j}^{n} + I_t}{1 + \lambda\,(I_i^2 + I_j^2)}\,I_i \quad (7)$$

$\bar{u}_{i,j}$ indicates averaging over the neighboring pixels and n is the iteration number.

A frame store 0 and a frame store 1 comprise a camera memory. The successive frames of the progressively-scanned video output signal from the analog-to-digital converter 20, as noted above, comprises frames of raster-scanned x-ray image information interspersed among frames of raster-scanned signal devoid of x-ray image information. Only the frames of raster-scanned x-ray image information are of interest and will be grabbed for writing into one of the frame stores 0 and 1 comprising the camera memory. One way of implementing such frame grabbing is: using a grabbed-frame counter for counting GRAB FRAME commands going to ONE, thereby to generate consecutive ordinal numbers modulo-two for the frames to be grabbed; ANDing the modulo-two count with the GRAB FRAME commands to generate write-enable commands for the frame store 0; and ANDing the complement of the modulo-two count with the GRAB FRAME commands to generate write-enable commands for the frame store 1. The frames of raster-scanned signal samples from the analog-to-digital converter 20 are directed through the time-division multiplexer 3, the optical flow computer 4, and read/write control 6 for the camera memory, the zeroeth or even grabbed frames to be written to the frame store 0, and the first or odd grabbed frames to be written to the frame store 1.

The frame stores 0 and 1 provide the frame delays needed in calculating $I_t$ in the optical flow computer 4, as further on will be explained in detail with reference to FIG. 4. The frame stores 0 and 1 also store the successive frames of from-camera samples, which the read/write control circuitry 6 for the camera memory reads to read/write control circuitry 7 for writing a display memory, which display memory comprises in FIG. 1 a frame store 8 for even frames and a frame store 9 for odd frames. AT any time except during retrace intervals, one of the frame stores 8 and 9 in this display memory is currently being read through the read/write control circuitry 7 to provide raster-scanned video samples to a video monitor 23. The successive frames of from-camera samples stored in frame stores 0 and 1 also are the basis from which each successive fill frame is calculated in the read/write control circuitry 7 for the display memory, thence to be used to update the contents of the one of the frame stores 8 and 9 other than the one that is currently being read to supply raster-scanned video samples to the video monitor 23.

A pixel-displacement computer 5, shown in FIG. 1 as being banked, calculates the displacement of each pixel proceeding from the components u and v of the displacement velocity vector for that pixel as furnished to the computer 5 from the computer 4. In a simple frame filling procedure using linear pixel interpolation, each successive frame of fill, each pixel has (horizontal) displacement $\Delta i = u(t/T)$ and (vertical) displacement $\Delta j = v(t/T)$ in the directions respectively parallel with and transverse to scan lines. A preferable frame filling procedure is, from the standpoint of improved performance as indicated in the Abdel-Malek, et alii paper "Image segmentation via motion vector estimates" is to use acceleration compensated interpolation, wherein, in each successive frame of fill, each pixel is displaced by $\Delta i = u(t/T) + 2^{-1}u'(t/T)^2$ in the direction parallel with scan lines, and each pixel is displaced by $\Delta j = v(t/T) + 2^{-1}v'(t/T)^2$ in the direction transverse to scan lines. FIG. 1 shows the pixel-displacement computer 5 to be of a type that calculates the displacement of each pixel proceeding from the components u and v of the displacement velocity vector for that pixel and the respective temporal derivatives u' and v' of u and v, as supplied from the computer 4. FIG. 1 shows the pixel-displacement computer 5 to be banked, with a parallel-in/serial-out (PISO) register 21 being used to arrange the parallelly calculated $\Delta i$ displacement samples in serial order corresponding with the order the pixels they are respectively associated with appear in raster scan, and with a parallel-in/serial-out (PISO) register 22 being used to arrange the parallelly calculated $\Delta j$ displacement samples in serial order corresponding with the order the pixels they are respectively associated with appear in raster scan. The serial $\Delta i$ displacement samples and the serial $\Delta j$ displacement samples are supplied to the the read/write control circuitry 7 for the display memory, where the displacement samples control the updating of the frame stores 8 and 9 from the frame stores 0 and 1 in a manner that further on will be described in greater detail with reference to FIGS. 7–9.

In closed-circuit television systems utilizing frame stores it is a common practice, not only to use progressive rather than interlaced-field scanning, but also to arrange for an integral power of two active scan lines in each frame and to add a smaller integral power of two non-active scan lines for accommodating vertical retrace in the video monitor. Typically, 512 active scan lines are used in each frame with 32 non-active scan lines for accommodating vertical retrace. The number of pixels per active portion of each scan line are normally chosen to be the same as the number of active scan lines, and the number of pixels per non-active portion of each scan line for accommodating horizontal retrace in the video monitor is about one-eigth as large. Typically, 512 active pixels and 64 non-active pixels are used in each scan line. A display area of 512 by 512 active pixels is readily mapped into a random access memory that is addressed by two orthogonal Cartesian-coordinate addresses expressed in binary coded format; and this display format will be assumed to be used in the invention in order to keep the description as straightforward and simple as possible. Persons skilled in the art of television system design and acquainted with this specification will thereby be enabled to design variants of the particular system being described, such as those which use interlacing of video samples.

FIG. 2 is a timing diagram of the basic operation of the FIG. 1 fluoroscopic apparatus when the video camera 18 supplies successive frames, . . . 2n−1, 2n, 2n+1, . . . of data during only selected ones of the frame intervals in which the writing and reading of frames stores 8 and 9 of display memory are alternately done. By way of example, the video camera 18 provides raster-scanned frames . . . 2n−1, 2n, 2n+1, . . . every third time the video monitor 23 has an electronic beam trace a frame on its viewscreen, and so a respective first and second fill-frame must be generated by the frame-filling procedure, for following each of the frames . . . 2n−1, 2n, 2n+1, . . . of camera-generated samples as digitized by the analog-to-digital converter 20. The even-numbered ones of the successive frames . . . 2n−1, 2n, 2n+1, . . . are written into the frame store 0, and the odd-numbered ones of those frames are written into the frame store 1. The writing of each pixel into one of the frame stores 0 and 1 is the final step of a respective read-then-write process for that respective pixel that reads the pixel data next to be updated for use in calculating a fill frame to be loaded into the one of the display memories 8 and 9 conditioned for being written.

When an even frame (e.g. frame 2n) of camera-generated data is to be grabbed, the previously grabbed even frame of camera-generated data is read from the frame store 0 to support the calculation of a final fill frame, before being written with the most current even frame of camera-generated data to be grabbed. At the same time an even frame of camera-generated data is being written into the frame store 0, the previous odd frame of camera-generated data stored in frame store 1 is being read to provide the data to be subtractively combined in the optical flow computer 4 with the current even frame, in order to generate the temporal gradient $I_t$ of each successive pixel in the time interval between the current, even and preceding, odd frames of camera-recorded image. The frame store 0 also reads the previous scan line of the even frame, as the current scan line of the even frame is being written to provide the optical flow computer 4 data to be subtractively combined with the current scan line of the even frame, in order to generate the spatial gradient $I_j$ of each pixel in the even frame in the direction transverse to the scan lines. During the supplying of the current even frame, the spatial gradient $I_i$ of each pixel in the even frame in the direction parallel to the scan lines is calculated. The gradients $i_i$, $I_j$ and $I_t$ are loaded at pixel scan rate into respective frame stores within the optical flow computer 4.

During the display frame immediately following the one in which the new even frame of camera-generated data is grabbed, the frame stores storing the gradients $i_i$, $I_j$ and $I_t$ are read from, being repeatedly scanned at many times faster than normal pixel scan rate as the optical flow computer 4 iteratively calculates for each pixel the components u and v of displacement velocity and their respective temporal derivatives u' and v' for the interval between the preceding (odd) and current (even) frames. The results of the computations during this frame, when display memory is being updated with the previously grabbed odd frame, would be available from computer 4 during the next display frame, but are not used until three display frames later. During this second display frame after grabbing the new even frame of camera-generated data, the stores for the u and v data are scanned at normal pixel scan rate to provide to the generation of the u, v, u' and v' data needed for calculating the first fill frame based on the most recent odd frame of camera-generated data as read from the frame store 1. This first fill frame based on the most recent odd frame of camera-generated data is written into the one of frames stores 8 and 9 other than the one the most recent odd frame of camera-generated data is being read from.

When an odd frame of camera-generated data is to be grabbed, the previously grabbed odd frame of camera-generated data is read from the frame store 1 to support the calculation of a final fill frame, before being written with the most current odd frame of camera-generated data to be grabbed. At the same time an odd frame of camera-generated data is being written into the frame store 1, the previous even frame of camera-generated data stored in frame store 0 is being read to provide the data to be subtractively combined in the optical flow computer 4 with the current odd frame, in order to generate the temporal gradient $I_t$ of each successive pixel in the time interval between the current odd and preceding even frames of camera-recorded image. The frame store 1 also reads the previous scan line of the odd frame, as the current scan line of the odd frame is being written to provide the optical flow computer 4 data to be subtractively combined with the current scan line of the odd frame, in order to generate the spatial gradient $I_j$ of each pixel in the odd frame in the direction transverse to the scan lines. During the supplying of the current odd frame, the spatial gradient $I_i$ of each pixel in the odd frame in the direction parallel to the scan lines is calculated. The gradients $i_i$, $I_j$ and $I_t$ are loaded at pixel scan rate into respective frame stores within the optical flow computer 4.

During the display frame immediately following the one in which the new odd frame of camera-generated data is grabbed, the frames stores storing the gradients, $i_i$, $I_j$ $I_t$ are read from, being repeatedly scanned at many times faster than normal pixel scan rate as the optical flow computer 4 iteratively calculates for each pixel the components u and v of displacement velocity and their respective temporal derivatives u' and v' for the interval between the preceding (even) and current (odd) frames. The results of the computations during this frame, when display memory is being updated with the previously grabbed even frame, would be available from computer 4 during the next display frame, but are not used until three display frames later. During this second display frame after grabbing the new odd frame of camera-generated data, the stores for the u and v data are scanned at normal pixel scan rate to provide for the generation of the u, v, u' and v' data needed for calculating the first fill frame based on the most recent even frame of camera-generated data as read from the frame store 0. This first fill frame based on the most recent even frame of camera-generated data is written into the one of frame stores 8 and 9 other than the one the most recent even frame of camera-generated data is being read from.

Figure 3:
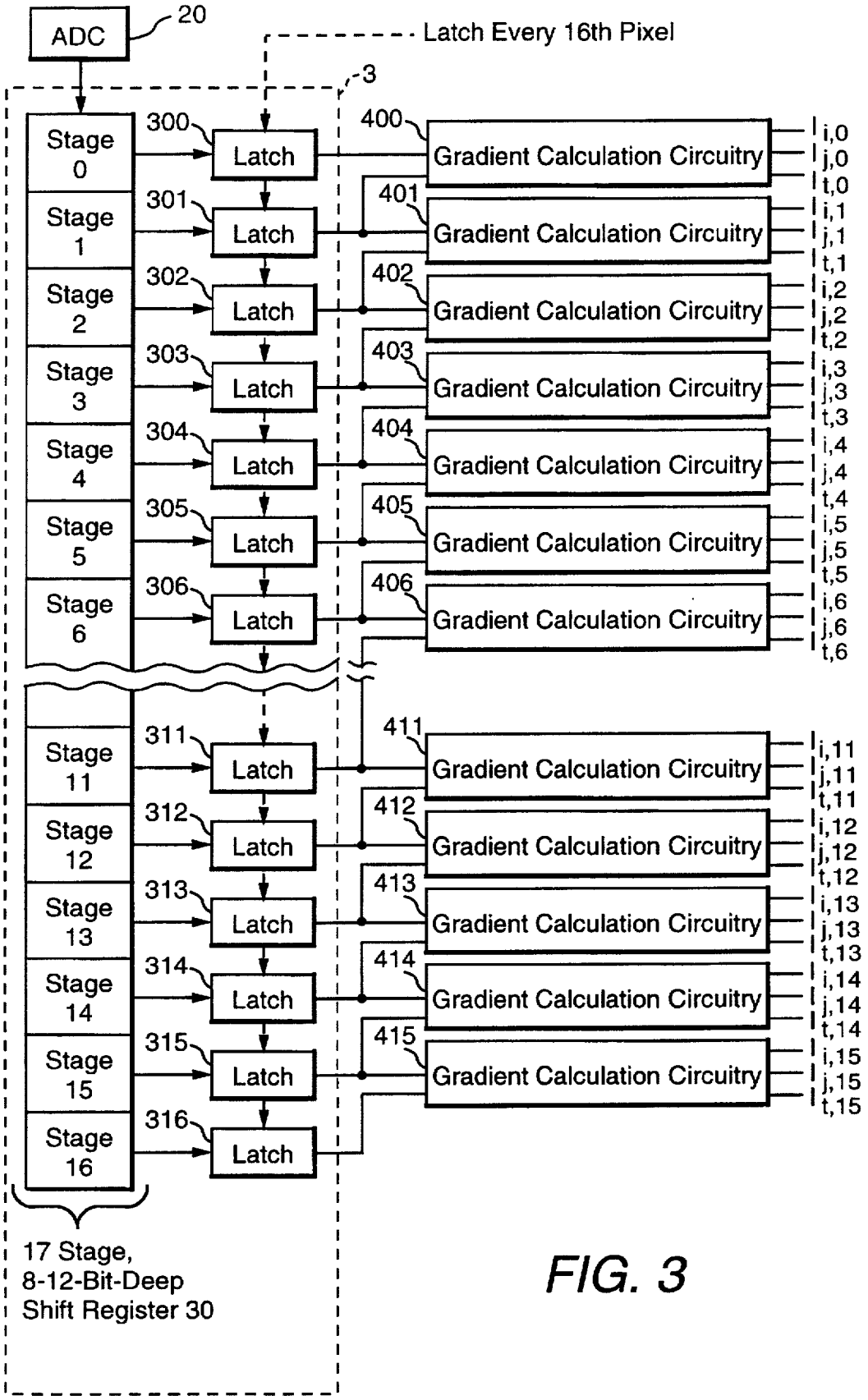
FIG. 3 is a schematic diagram of how time-division-multiplexing is provided for the gradient calculation apparatus used in the optical flow computer of the frame filling apparatus in the FIG. 1 fluoroscopic apparatus, thereby arranging for the computation of the optical flow in a plurality of spatial phases.

FIG. 3 shows with greater particularity the nature of the time-division multiplexer 3, which is a serial-in/parallel-out (SIPO) register. The time-division multiplexer 3 includes a 17-stage shift register 30 having sufficient bit depth to accommodate samples shifted thereinto from the analog-to-digital converter 20. The contents of the zeroeth through sixteenth stages of the shift register 30 are latched into latches 300–316 every sixteenth pixel scan interval to remove time skew in the sixteen spatial phases in the (horizontal) i direction. Gradient calculation circuitry 400 calculating $I_i$, $I_j$ and $I_t$ gradients for the zeroeth spatial phasing is supplied input signals from the latches with identification numerals one-hundred and one-hundred-one lower than its own identification numeral. Respective input signals for the gradient calculation circuitry 401–415 calculating $I_i$, $I_j$ and $I_t$ gradients for the first through fifteenth spatial phases respectively are obtained analogously.

FIG. 4 shows with greater particularity the nature of the gradient calculation circuitry (400+$\phi$) for the $\phi^{th}$ one of the zeroeth through fifteenth spatial phases, the respective gradient calculation circuitry for each of the zeroeth through fifteenth spatial phases being similar to the respective gradient calculation circuitry for each of the other spatial phases. The output signal from the latch (301+$\phi$) descriptive of the most recent previous-phase pixel in the current scan line is subtracted in a digital subtractor 24 from the output signal from the latch (300+$\phi$) descriptive of the most recent $\phi$-phase pixel in the current scan line to generate $I_{i,\phi}$, the spatial gradient of the most recent pixel of the $\phi^{th}$ spatial phasing in the i direction parallel to scan lines. The output signal from the latch (300+$\phi$) descriptive of the most recent $\phi$-phase pixel in the current scan line has a signal descriptive of the $\phi$-phase pixel in the previous scan line subtracted therefrom in a digital subtractor 25 to generate $I_{j,\phi}$, the spatial gradient of the most recent pixel of the $\phi^{th}$ spatial phasing in the j direction transverse to scan lines. The output signal from the latch (300+$\phi$) descriptive of the most recent $\phi$-phase pixel in the current scan line has a signal descriptive of the correspondingly-located pixel in the previous frame subtracted therefrom in a digital subtractor 26 to generate $I_{t,\phi}$, the temporal gradient of the most recent pixel of the $\phi^{th}$ spatial phasing.

The signal descriptive of the $\phi$-phase pixel in the previous scan line and the signal descriptive of the correspondingly-located pixel in the previous frame are each read from separate ones of the frame stores 0 and 1 forming the camera memory, and the provisions for doing this will now be considered. The frame stores 0 and 1 shown in FIG. 1 are each doubly banked to allow a 16-sample-wide, 2-sample-high window to be accessed from each. Each of the memories 0 and 1 is divided into sixteen submemories in the i dimension, to accomodate the sixteen spatial phases in the direction parallel to line scan, which spatial phases are used in the polyphase calculations being described. Addressing of the sixteen submemories in the i dimension is done parallelly using a truncation of the output count from a pixel counter used as a horizontal digital scan generator, in which truncation the four least significant bits are suppressed. There is also subdivision of each of the submemories into two banks in the j direction transverse to line scan, to facilitate both current and previous scan lines in memory being concurrently available. Addressing of the two banks in each submemory in the j direction is done to provide continuous scanning of the current and previous scan lines in memory without permutation, proceeding from the output count of a line counter used as a vertical digital scan generator. This sort of addressing can be done, for example, as described by L. A. Christopher et alii in U.S. Pat. No. 4,460,958 issued 17 Jul. 1984 and entitled "WINDOW-SCANNED MEMORY".

The concurrent availability of two scan lines in the memories 0 and 1 allows for the one being written into to be read from one scan line later to supply the signal descriptive of $\phi$-phase pixel in the previous scan line. FIG. 4 shows the two banks 0$\phi$0 and 0$\phi$1 of the $\phi^{th}$ of the zeroeth through fifteenth submemories of the frame store 0. Further, FIG. 4 shows the two banks 1$\phi$0 and 1$\phi$1 of the $\phi^{th}$ of the zeroeth through fifteenth submemories of the frame store 1.

A grabbed-frame counter 2, shown in FIG. 4 and located in the master control circuitry 2 of FIG. 1, is arranged for modulo-two counting of the grabbed frames of video which, as shown in FIG. 1, are supplied from the video camera 18 to the analog-to-digital converter 20 and thence through the time-division multiplexer 3 to the optical flow computer 4. A scan line counter 28, shown in FIG. 4 and located in the master control circuitry 2 of FIG. 1, is arranged for modulo-two counting of the successive scan lines in each frame. The output signal from the latch (300+$\phi$) descriptive of the most recent $\phi^{th}$-spatial-phase pixel in the current scan line is supplied to a multiplexer 29 as its input signal.

When the grabbed-frame counter 27 count is ZERO, the banked frame store 0 shown in FIG. 1 as storing the even grabbed frames of camera 18 video samples after their digitization is written into with each successive one of those samples describing a current pixel; and the banked frame store 1 shown in FIG. 1 as storing the odd grabbed frames of camera 18 video samples after their digitization is read from, to provide the signal descriptive of the correspondingly-located pixel in the previous frame. Responsive to the modulo-two count from the grabbed-frame counter 27 being ZERO and to the modulo-two count from the line counter 28 being ZERO, the multiplexer 29 selects its input signal as data to be written into the bank 0$\phi$0 of the frame store 0; a multiplexer 90 selects, as subtrahend input signal for the subtractor 25, data read from the bank 0$\phi$1 of the frame-store 0 as the signal descriptive of the $\phi$-phase pixel in the previous scan line; and the multiplexer 90 selects, as subtrahend input signal for the subtractor 26, data read from the bank 1$\phi$0 of the frame-store 1 as the signal descriptive of the $\phi$-phase pixel in the previous frame that is located in correspondence with the most recent $\phi$-phase pixel. Responsive to the modulo-two count from the grabbed-frame counter 27 being ZERO and to the modulo-two count from the line counter 28 being ONE, the multiplexer 29 selects its input signal as data to be written into the bank 0$\phi$1 of the frame-store 0; the multiplexer 90 selects, as subtrahend input signal for the subtractor 25, data read from the bank 0$\phi$0 of the frame-store 0 as the signal descriptive of the $\phi$-phase pixel in the previous scan line; and the multiplexer 90 selects, as subtrahend input signal for the subtractor 26, data read from the bank 1$\phi$1 of the frame-store 1 as the signal descriptive of the $\phi$-phase pixel in the previous frame that is located in correspondence with the most recent $\phi$-phase pixel.

When the grabbed-frame counter 27 count is ONE, the banked frame store 1 shown in FIG. 1 as storing the odd frames of camera 18 video samples after their digitization is written into with each successive one of those samples describing a current pixel; and the banked frame store 0 shown in FIG. 1 as storing the even frames of camera 18 video samples after their digitization is read from, to provide the signal descriptive of the correspondingly-located pixel in the previous frame. Responsive to the modulo-two count from the grabbed-frame counter 27 being ONE and to the modulo-two count from the line counter 28 being ZERO, the multiplexer 29 selects its input signal as data to be written into the bank 1$\phi$0 of the frame-store 1; the multiplexer 90 selects, as subtrahend input signal for the subtractor 25, data read from the bank 1$\phi$1 of the frame-store 1 as the signal descriptive of the $\phi$-phase pixel in the previous scan line; and the multiplexer 90 selects, as subtrahend input signal for the subtractor 26, data read from the bank 0$\phi$0 of the frame-store 0 as the signal descriptive of the $\phi$-phase pixel in the previous frame that is located in correspondence with the most recent $\phi$-phase pixel. Responsive to the modulo-two count from the grabbed-frame counter 27 being ONE and to the modulo-two count from the line counter 28 being ONE, the multiplexer 29 selects its input signal as data to be written into the bank 1$\phi$1 of the frame-store 1; the multiplexer 90 selects, as subtrahend input signal for the subtractor 25, data read from the bank 1$\phi$0 of the frame-store 1 as the signal descriptive of the $\phi$-phase pixel in the previous scan line; and the multiplexer 90 selects, as subtrahend input signal for the subtractor 26, data read from the bank 0$\phi$1 of the frame-store 0 as the signal descriptive of the $\phi$-phase pixel in the previous frame that is located in correspondence with the most recent $\phi$-phase pixel.

Respective banked frame stores are provided for $I_i$ values, $I_j$ values and $I_t$ value, each of which frame stores has a respective submemory for each of the spatial phase 400–415 of the gradient calculation circuitry. The successively determined $I_{i,\phi}$ values from the subtractor 24 are loaded into the $\phi^{th}$ submemory 91 of the frame store for $I_i$ values, the successively determined $I_{j,\phi}$ values from the subtractor 25 are loaded into the $\phi^{th}$ submemory 92 of the frame store for $I_j$ values, and the successively determined $I_{i,\phi}$ values from the subtractor 24 are loaded into the $\phi^{th}$ submemory 91 of the frame store for $I_i$ values. The frame stores for $I_i$ values, $I_j$ values and $I_t$ values are loaded at relatively slow rate during the grabbed frame, but are read at relatively high rate during the next display frame interval, to support the Gauss-Seidel iterations of equations (6) and (7) being carried out many times in the FIG. 6 circuitry. (The use of the frame stores for $I_i$ values and $I_j$ values can be avoided by reading from the more recently updated frame of the camera memory at relatively high rate during the next display frame interval after that during which a frame is grabbed, then calculating the $I_{i,\phi}$ and $I_{j\phi}$ spatial gradients from the read-out).

During the next display frame interval after that during which a frame is grabbed, the optical flow computer is provided relatively-high-rate raster scan addresses for reading the frame store for $I_i$ values for reading the frame store for $I_j$ values, for reading the frame store $I_t$ values, for reading and writing a two-frame store for u values and for reading and writing a two-frame store for v values. The relatively-high-rate raster scan addresses are generated by horizontal and vertical digital scan generators especially provided for this purpose. These horizontal and vertical digital scan generators are clocked at a multiple (e.g., sixteen times) of the clocking rate for horizontal and vertical digital scan generators 64 and 65 shown in FIG. 8, which horizontal and vertical digital scan generators 64 and 65 control the clocking of the frame stores 0 and 1 in camera memory and the frame stores 8 and 9 in display memory. The horizontal and vertical digital scan generators 64 and 65 also control the raster scanning of the frame stores 91, 92 and 93 during their being written and the raster scanning of the two-frame stores for u and v values when they are read during the calculation of pixel displacements during display frames other than those just after a frame is grabbed.

Figure 5:
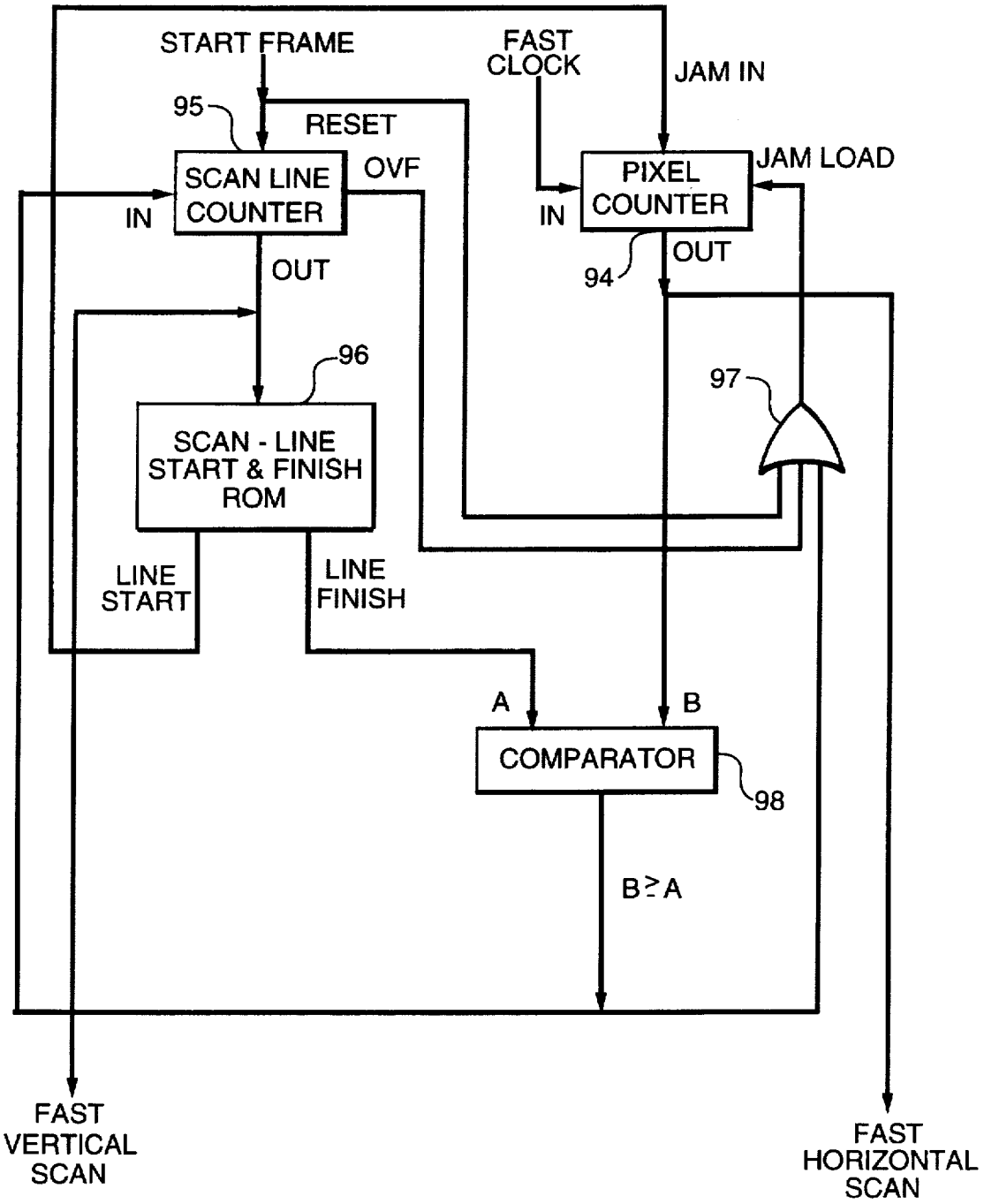
FIG. 5 is a schematic diagram of horizontal and vertical digital scan generation circuitry for the optical flow computer in the FIG. 1 fluoroscopic apparatus.

FIG. 5 shows circuitry that can generate the relatively-high-rate raster scan addresses. The high-rate horizontal raster scan addresses are generated as the count output of a pixel counter 94, and the high-rate vertical raster scan addresses are generated as the count output of a scan line counter 95. Counters 94 and 95 are nine-stage binary counters, assuming a 512 pixel by 512 scan line active display field. The pixel scan counter 94 counts a fast clock signal that is several times the normal pixel scan rate during display. In some fluoroscopic images exhibiting rapid motion—fluoroscopic observations of the heart, for example—there is interest *in* only the portions of the images which appear within a circular area inscribed within the video monitor screen or within a circle with flattened sides *ellipse*. Accordingly, the number of iterative calculations the optical flow computer 4 can make within a display frame internal following frame grab for a given-rate fast clock signal can be [increase] *increased* if the corners of the display are not scanned during the calculations of optical flow. A read-only memory (ROM) 96 addressed by the scan line count from the counter 95 stores the horizontal start and finish coordinates for the scanning windows in the memories 37, 41, 91, 92 and 93 for each successive line of scan. The horizontal start coordinate currently supplied from the ROM 96 are jam-loaded into the pixel counter 94 responsive to a JAM LOAD command being received by the counter. The JAM LOAD command is generated as the [outptu] *output* signal of a OR gate 97, responsive to a START FRAME command that resets the scan line counter 95 to zero scan line count, or to count overflow being reached by the scan line counter 95, or to a ONE output from a digital comparator 98. The pixel counter 94 counts forward from this horizontal start coordinate, and the pixel count is supplied to the digital comparator 98 for comparison with the horizontal finish coordinate currently supplied from the ROM 96. When the pixel count from the pixel counter 94 reaches that horizontal finish coordinate, the comparator 98 output signal changes from ZERO to ONE. This ONE advances the scan line count supplied from the counter 95 by one, and as applied as input signal to OR gate 97 generates the JAM LOAD command that causes the horizontal start coordinate of this next scan line to be jam-loaded into the pixel counter 94. Where the entire fluoroscopic image is of interest, the pixel counter 94 and the scan line counter 95 can be operated conventionally, but keeping higher rate clocking pulses applied to the count input of the pixel counter 94, in order to provide a full rater scan at scan rates that are multiples of the normal scan rates.

Figure 6:
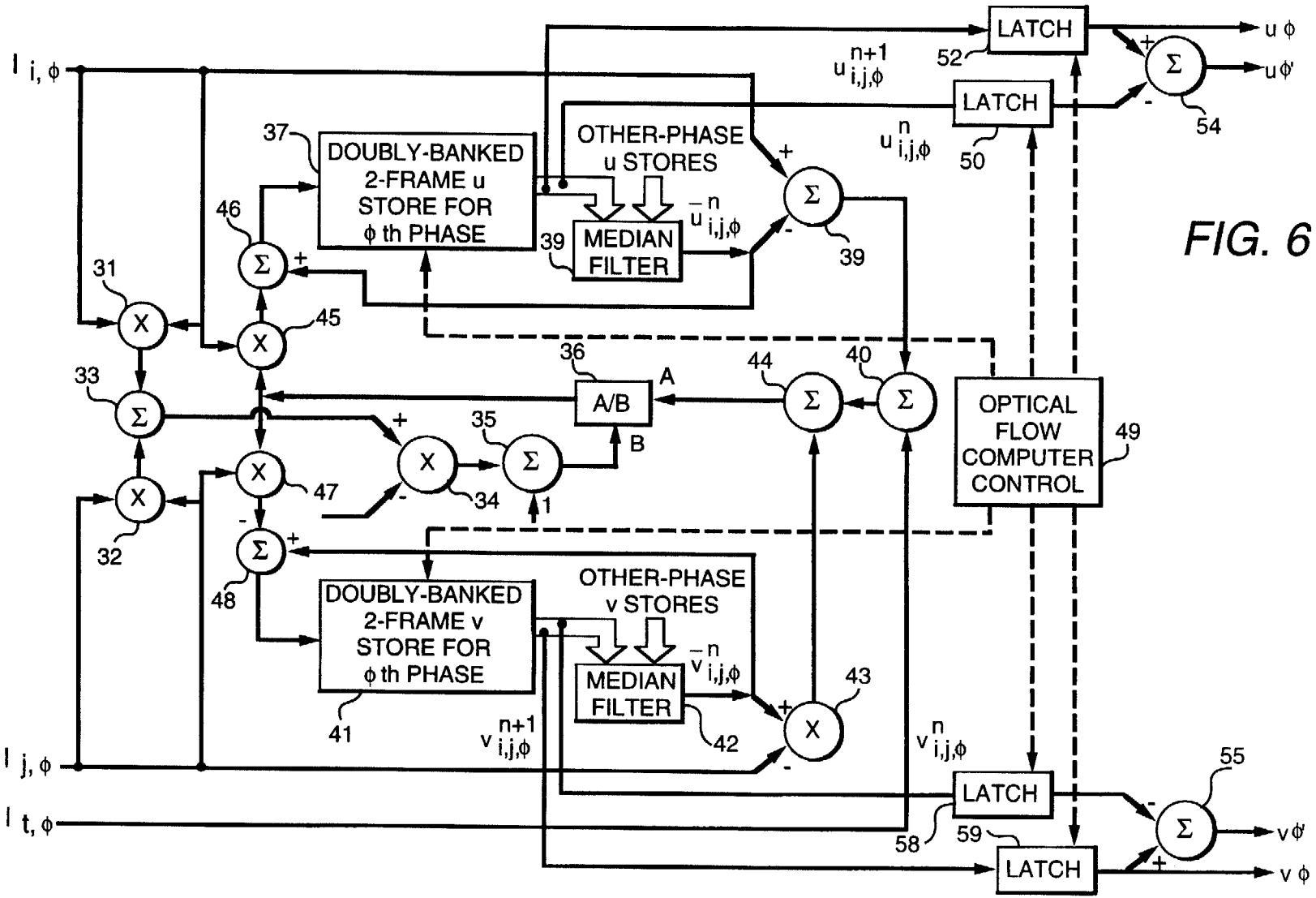
FIG. 6 is a schematic diagram of the apparatus for calculating the orthogonal components of the pixel displacement velocity vector and their temporal derivatives for pixels of one spatial phase.

FIG. 6 shows the portion of the optical flow computer 4 in which are made the calculations of $u_\phi$ and $v_\phi$, the $\phi^{th}$ spatial phases of the components u and v of the displacement velocity vector in the i and j directions. The first derivatives with time of $u_\phi$ and $v_\phi$ are also calculated in the portion of the optical flow computer 4 shown in FIG. 6. For the sake of simplifying the successive scanning of the pixels, the Gauss-Seidel iterations are assumed to be carried out the same number of times for each pixel, the number of times (e.g., sixteen times) being chosen high enough to converge the last u estimates and to converge the last v estimate for each pixel. The calculations proceed, beginning with the gradients $I_{i,\phi}$, $I_{j,\phi}$ and $I_{t,\phi}$ supplied from the submemories 91, 92 and 93 of FIG. 4.

The square of $I_{i,\phi}$ is generated by a digital multiplier 31 that multiplies $I_{i,\phi}$ by itself; the square of $I_{j,\phi}$ is generated by a digital multiplier 32 that multiplies $I_{j,\phi}$ by itself; the sum of the squares of $I_{i,\phi}$ and $I_{j,\phi}$ is subsequently generated by a digital adder 33; the sum of the squares of $I_{i,\phi}$ and of $I_{j,\phi}$ is multiplied by a factor $\lambda$ in a digital multiplier 34; and the resulting product is augmented by unity in a digital adder 35 to generate a divisor signal for a digital divider 36. The factor $\lambda$ is chosen according to the noisiness of the image, being chosen smaller for noisier images, and has range from just less than one to as high as fifty in the inventors' investigations. The divisor signal supplied to the divider 36 corresponds to the denominator of fractions found in equations (6) and (7) above.

The previous estimates of $u_\phi$ are stored in a submemory 37 that is the $\phi^{th}$ submemory of zeroeth through fifteenth submemories of the memory for storing the previous estimates of u for each of the pixels in two frames. The two frames in the submemory 37 are arranged to be concurrently available from respective halves of the submemory 37; and each half of the submemory 37 is subdivided in both the i and j directions into a plurality of banks, which banks can be considered to be arrayed by row and by column in accordance with respective moduli of submemory addresses in the i and j directions. The two frames stored in the submemory 37 are arranged to be concurrently window-scanned without permutation of samples in either the i direction or the j direction. The bank of the submemory 37 chosen for writing the most recent estimate of $u_\phi$ for the most recent $\phi$-phase pixel after reading the previous estimate of $u_{100}$ for that pixel (or, at the beginning of a cycle of calculations, for the pixel a frame earlier) is one which is currently in a position near the center of the scanning window, the choice being the same for each of the zeroeth through fifteenth submemories for storing estimates of u. The previous estimate of $u_\phi$ for the most recent $\phi$-phase pixel is read from the submemory 37 concurrently with estimates of u for neighboring pixels being read from submemory 37 and the other submemories storing estimates of u. The previous estimates of u for the most recent $\phi$-phase pixel and its neighboring pixels are supplied to a filter 38 that is three-dimensional in the space-time continuum of video samples. Filter 38 is a median filter that replaces the previous estimate of $u_\phi$ for the most recent $\phi$-phase pixel when it departs significantly from most of its neighbors. Replacement is with a weighted average of the replaced pixel and its neighboring pixels. A digital multiplier 39 multiplies $I_{i,\phi}$ by the response of the median filter 38 to generate one of the product terms in the numerator of the fraction in equations (6) and (7) above, which product term is added to $I_{i,\phi}$ in a digital adder 40.

The previous estimates of $v_\phi$ are stored in a submemory 41 that is the $\phi^{th}$ of zeroeth through fifteenth submemories of the memory for storing the previous estimates of v for each of the pixels in a frame. The submemory 41 is subdivided in both the i and j directions into a plurality of banks the same as the submemory 37 and is arranged to be window-scanned without permutation of samples in either the i direction or the j direction. The bank of the submemory 41 chosen for writing the most recent estimate of $v_\phi$ for the most recent $\phi$-phase pixel after reading the previous estimate of $v_\phi$ for that pixel (or, at the beginning of a cycle of calculations, for the pixel a frame earlier) is one which is currently in a position near the center of the scanning window, the choice being the same for each of the zeroeth through fifteenth submemories for storing estimates of v and the same as made for each of the zeroeth through fifteenth submemories for storing estimates of u. The previous estimate of $v_\phi$ for the most recent $\phi$-phase pixel is read from the submemory 41 concurrently with estimates of v for neighboring pixels being read from submemory 41 and the other submemories storing estimates of v. The previous estimates of v for the most recent $\phi$-phase pixel and its neighboring pixels are supplied to a filter 42 that is three-dimensional in the space-time continuum of video samples. Filter 42 is a median filter identical to the filter 38. A digital multiplier 43 multiplies $I_{j,\phi}$ by the response of the median filter 42 to generate another of the product terms in the numerator of the fraction in equations (6) and (7) above, which product term is added in a digital adder 44 to the sum output of the adder 40. The sum output signal of the adder 44 is the complete numerator of the fraction in equations (6) and (7), and this sum is supplied to the divider 36 as its dividend input signal.

The divider 36 generates the fractional term appearing in equations (6) and (7). The fractional term is multiplied by $I_{i,\phi}$ in a digital multiplier 45 to generate a product output signal that is subtracted from the median filter 38 output signal in a digital subtractor 46. The resulting difference [outptu] *output* signal from the subtractor 46 is the revised estimate of $u_\phi$ that is written to submemory 37 to replace the previous estimate of $u_\phi$ for the pixel. The fractional term generated by the divider 36 is multiplied by $I_{j,\phi}$ in a digital multiplier 47 to generate a product output signal that is subtracted from the median filter 42 output signal in a digital subtractor 48. The resulting difference output signal from the subtractor 48 is the revised estimate of $v_\phi$ that is written to submemory 41 to replace the previous estimate of $v_\phi$ for the pixel.

At the outset of computing the displacement velocity of a pixel, control circuitry 49 for the optical flow computer 4 commands digital latches 50 and 51 to latch the final estimates of $u_\phi$ and $v_\phi$ for the corresponding pixel in the previous frame, as read from the submemories 37 and 42 respectively and filtered by the median filters 38 and 43 respectively. At the close of computing the displacement velocity of a pixel, the control circuitry 49 commands digital latches 52 and 53 to latch the final estimates of $u_\phi$ and $v_\phi$ for the pixel, as read from the submemories 37 and 42 respectively and filtered by the median filters 38 and 43 respectively. This latter procedure discards aberrant final estimates of $u_\phi$ and $v_\phi$ for the pixel that would otherwise be likely to cause substantial errors in the pixel displacement vector as finally calculated, which aberrant final estimates arise when the gradients, $I_{i,\phi}$, $I_{j,\phi}$ and $I_{t,\phi}$ are large because of noise pulses in the video output of the camera 18. A digital subtractor 54 subtracts the contents of latch 50 from the contents of latch 52 to generate the temporal derivative $u_\phi'$ of $u_\phi$; and a digital subtractor 55 subtracts the contents of latch 51 from the contents of latch 53 to generate the temporal derivative $v_\phi'$ and $v_\phi$.

Storing two successive frames of $u_\phi$ samples in submemory 37 and two successive frames of $u_\phi$ samples in submemory 41 makes it unnecessary to provide frame stores for the $u_\phi'$ and $v_\phi'$ temporal derivatives. At the same time, a greater number of neighboring pixel values is made available to the filters 38 and 41 for use in filtering $u_\phi$ and $v_\phi$.

Alternatively, but at the cost of increased digital hardware, one can arrange to make calculations of optical flow more accurate than those possible with the combined apparatus of FIGS. 4–6. The calculations by the combined apparatus of FIGS. 4–6 presume that the u component of the optical displacement velocity of a pixel are the same in both the positive and negative i directions and that the v component of the optical displacement velocity of a pixel are the same in both the positive and negative j directions, which presumptions are not always correct. More sophisticated apparatus for determining the spatial gradient $I_i$ calculates it in slightly delayed time based on three successive pixels, a pixel preceeding a "current" pixel, the "current" pixel, and a pixel succeeding a "current" pixel. The i-direction spatial gradients between the earlier and the "current" pixels and between the "current" and later pixels are separately calculated. The particular i-direction spatial gradient to be used in the calculations by the FIG. 6 apparatus is chosen according to the positive or negative direction of the velocity component $u_\phi$ for the particular pixel for which calculations are being made. Inserting, after the time-division multiplexer 3, respective scan line stores for the various spatial phases accomodates more sophisticated apparatus for determining the spatial gradient $I_j$ permitting the i-direction spatial gradients between the "current" pixel and the corresponding pixel one line later and the corresponding pixel one line earlier and the "current" pixel to be separately calculated. The particular j-direction spatial gradient to be used in the calculations by the FIG. 6 apparatus is chosen according to the positive or negative direction of the velocity component $v_\phi$ for the particular pixel for which calculations are being made.

Figure 7:
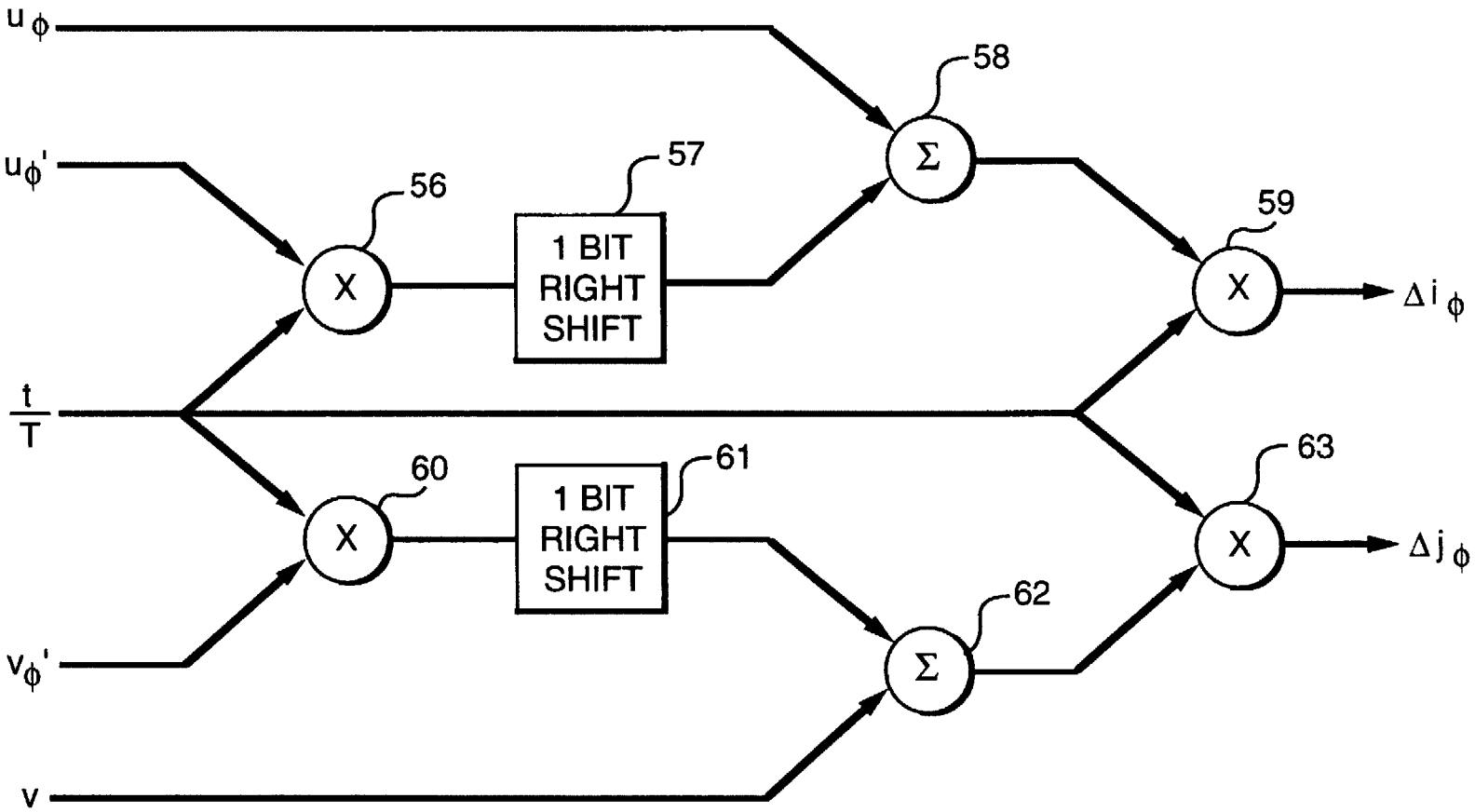
FIG. 7 is a schematic diagram of apparatus for calculating the pixel displacement vector for pixels of one spatial phase, proceeding from the orthogonal components of the pixel displacement velocity vector and their temporal derivatives calculated by the FIG. 6 apparatus.

FIG. 7 shows the digital circuitry for generating the components $\Delta i_\phi$ and $\Delta i_\phi$ of the displacement vector for a $\phi$-spatial-phase pixel, responsive of its $u_\phi$ and $v_\phi$ displacement velocity components and to its $u_\phi'$ and $v_\phi'$ displacement acceleration components. A digital representation of the variable t/T defining the time interval between a fill frame and the immediately preceding frame is furnished to the FIG. 7 circuitry from the master control circuitry 2. A digital multiplier 56 multiplies the $u_\phi'$ displacement acceleration component by t/T, and the resulting product is halved by a wired shift 57 to generate an addend input signal for a digital adder 58 receiving the $u_\phi$ displacement velocity component as an augend input signal. A digital multiplier 59 multiplies the sum output signal from the adder 58 by t/T to generate the component $\Delta i_\phi = u_\phi(t/T) + 2^{-1} u_\phi'(t/T)^2$ of the pixel displacement vector for the $\phi$-spatial-phase pixel. A digital multiplier 60 multiplies the $v_\phi'$ displacement acceleration component by t/T, and the resulting product is halved by a wired shift 61 to generate an addend input signal for a digital adder 62 receiving the $v_\phi$ displacement velocity component as an augend input signal. A digital multiplier 63 multiplies the sum output signal from the adder 62 by t/T to generate the component $\Delta j_\phi = v_\phi(t/T) + 2^{-1} v_\phi'(t/T)^2$ of the pixel displacement vector for the $\phi$-spatial-phase pixel.

The inventors have found that acceptable performance can be achieved with some saving in hardware by calculating the components $\Delta i_\phi$ and $\Delta i_\phi$ of the pixel displacement vector for a $\phi$-spatial-phase pixel, responsive just to its $u_\phi$ and $v_\phi$ displacement velocity components without calculating its $u_\phi'$ and $v_\phi'$ displacement acceleration components. The FIG. 6 optical flow computer is simplified since the elements 50, 54, 55 and 58 are dispensed with. The FIG. 7 circuitry is simplified by dispensing with the elements 56, 57, 58, 60, 61, and 62. The digital representation of the variable t/T defining the time interval between a fill frame and the immediately preceding frame is still furnished to the FIG. 7 circuitry from the master control circuitry 2. The digital multiplier 59 simply multiplies the $u_\phi$ displacement velocity component by t/T to generate the component $\Delta i_\phi = u_\phi(t/T)$ of the pixel displacement vector for the $\phi$-spatial-phase pixel; and the digital multiplier 63 simply multiplies the $v_\phi$ displacement velocity component by t/T to generate the component $\Delta j_\phi = v_\phi(t/T)$ of the pixel displacement vector for the $\phi$-spatial-phase pixel.

The inventors have found that, in the FIG. 6 optical flow computer, the $u_\phi$ displacement velocity component store 37 and the $v_\phi$ displacement velocity component store 41 can each be reduced to a frame plus a few scan lines in size to effect a further hardware saving. The inventors have also found that, in the FIG. 6 optical flow computer, the median filters 39 and 42 may be replaced with simple weighted summation circuits operative as spatial low-pass filters. Median filtering of the displacement vector comprising the components $\Delta i_\phi$ and $\Delta j_\phi$ is then done to suppress isolated gross pixel errors in the predicted fill frame.

Figure 8:
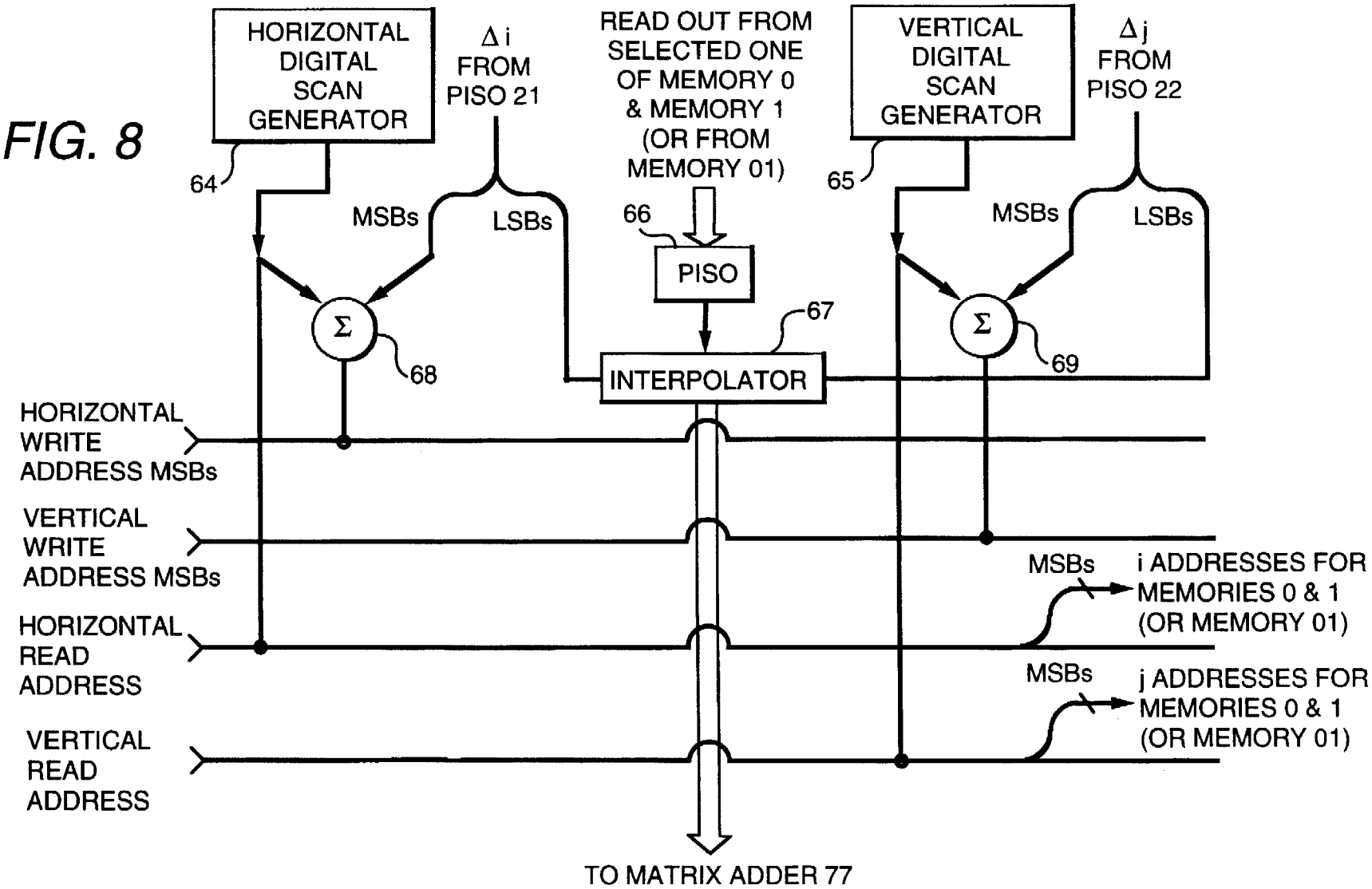
FIGS. 8 and 9 together are a schematic diagram of apparatus, responding to the pixel displacement vectors calculated for the plurality of spatial phases by respective apparatuses per FIG. 7, for modifying actual fluoroscopic image frames to generated intervening fill frames of fluoroscopic image.

FIG. 8 indicates more particularly how the pixel displacement vectors calculated for the plurality of spatial phases by respective apparatuses per FIG. 7 are used in re-mapping a raster-scanned image read from a selected one of the camera memory frame stores 0 and 1 into a modified set of spatial coordinates to be written as a fill frame to a selected one of the display memory frame stores 8 and 9. A horizontal digital scan generator 64 and a vertical digital scan generator 65 generate the horizontal (i) and vertical (j) addresses for both the even-frame stores 0 and the odd-frame store 1 in camera memory. The vertical (j) addresses supplied from the vertical digital scan generator 65 are the scan line count in progressive scanning. These vertical (j) addresses are applied to the frame stores 0 and 1 so as to scan two lines concurrently. These vertical (j) addresses are also applied to the one of the frame stores 8 and 9 currently selected for reading video samples on a raster-scanned basis to the video monitor 23. The horizontal digital scan generator 64 counts the number of pixels per scan line in the display to generate the horizontal (i) addresses applied to the one of the frame stores 8 and 9 currently selected for reading video samples on a raster-scanned basis to the video monitor 23, which implements continuous horizontal scanning of that frame store.

As previously noted, the frame stores 0 and 1 in the camera memory receive only the more significant bits of the horizontal (i) addresses generated by the horizontal digital scan generator 64, the sixteen least significant bits not being included in the horizontal (i) addresses as applied to the frame stores 0 and 1. Accordingly, the 16-sample-wide, 2-sample-high scanning windows supplied from the frame stores 0 and 1 during their reading are not continuously scanned, but rather are jump-scanned. A parallel-in/serial-out (PISO) register 66 converts one-sample-high segments of the successive 16-sample-wide, 2-sample-highs canning windows supplied from the frame stores 0 and 1 to continuous digital scanning of the current scan line. The serial video samples from the PISO register 66 are supplied as input signal to a write multiplexer 75 for display memories 8 and 9, as shown more particularly in FIG. 9.

The components $\Delta i$ and $\Delta j$ of the pixel displacement vector for the current pixel are available from the PISO registers 21 and 22, respectively, as shown in FIG. 1. In FIG. 8 a digital adder 68 adds the $\Delta i$ component of pixel displacement to the horizontal (i) addresses generated by the horizontal digital scan generator 64, and a digital adder 69 adds the $\Delta j$ component of pixel displacement to the vertical (j) addresses generated by the vertical digital scan generator 65. The sum outputs of the adders 68 and 69 provide the integer portions of the horizontal (i) addresses and the vertical (j) addresses of the current pixel as it appears in the current fill frame, which are used to address the one of the frame stores 8 and 9 in which the current fill frame is being written.

The fractional portions of the $\Delta i$ and $\Delta j$ pixel displacements correspond to what the fractional portions of the sum outputs of the adders 68 and 69 would be if the additions of the $\Delta i$ and $\Delta j$ pixel displacements to scan generator 64 and 65 addresses were performed full-width—that is, additional resolution in regard to the spatial positioning of the current pixel in the fill frame. FIG. 8 shows the less significant bits of the $\Delta i$ and $\Delta j$ pixel displacement being discarded, but they *may* be written as additional pixel data into the one of the frame stores 8 and 9 in which the current fill frame is being written. When the frame store is read *to provide* the next display frame to the video monitor 23, the additional pixel data may be used to control minor deflection of the kinescope to introduce perturbations from normal raster scan that more accurately locate the displaced pixel on the kinescope screen. These procedures are described by W. J. Davis in U.S. Pat. No. 4,415,889 issued 15 Nov. 1983 and entitled "RASTER-SCANNED CRT DISPLAY SYSTEM WITH IMPROVED POSITIONAL RESOLUTION FOR DIGITALLY ENCODED GRAPHICS". These procedures are also described by A. Sasaki et alii in U.S. Pat. No. 4,481,509 issued 6 Nov. 1984 and entitled "RASTER-SCANNED DISPLAY SYSTEM FOR DIGITALLY-ENCODED GRAPHICS".

Figure 9:
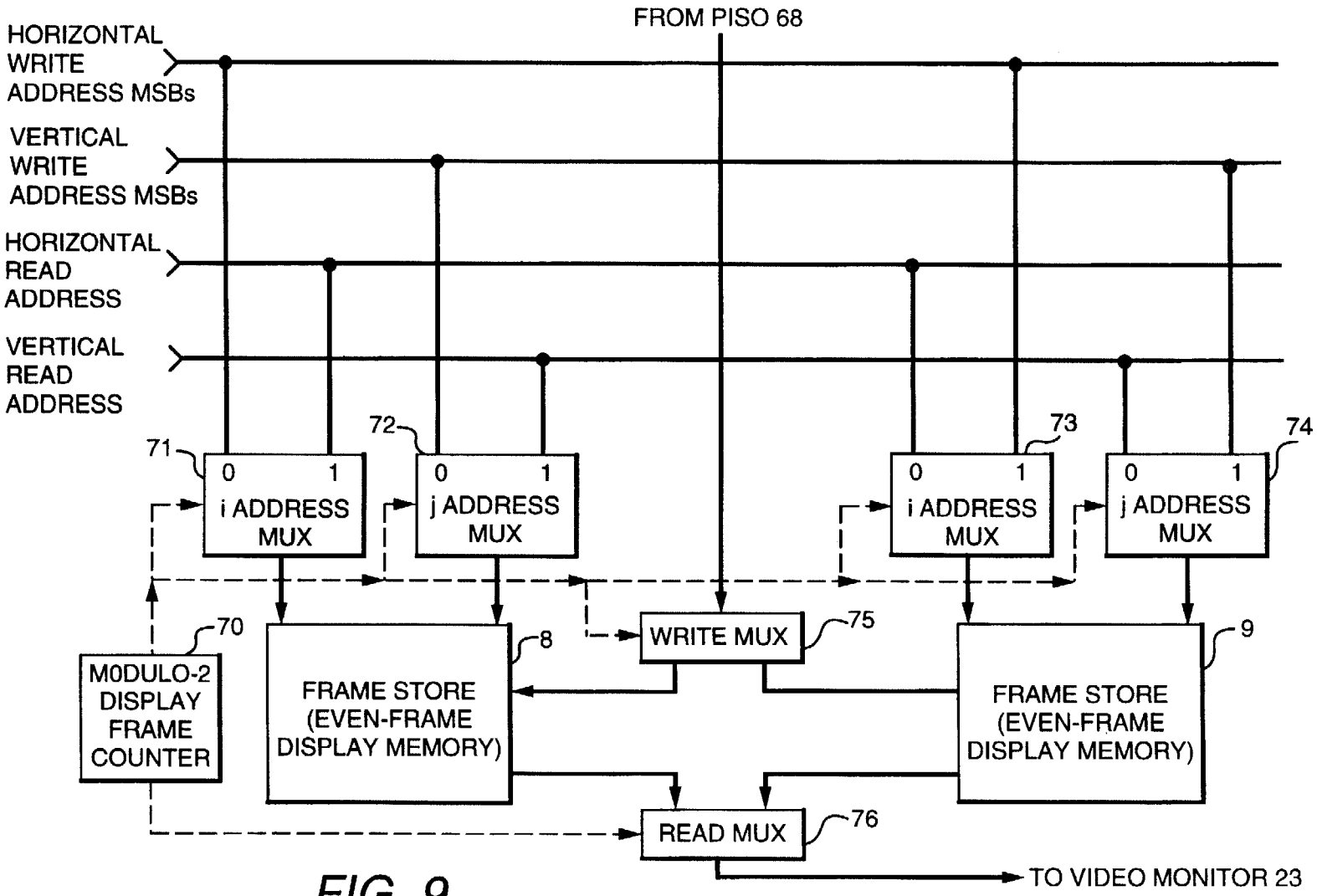

FIG. 9 shows in greater detail how the frame stores 8 and 9 in the display memory are alternately written and read in successive frame scan intervals. A counter 70 counts the successive display frames modulo-two to generate control signal for the horizontal (i) address multiplexer 72 for the frame store 8, for the vertical (j) address multiplexer 72 for the frame store 8, for the horizontal (i) address multiplexer 73 for the frame store 9, for the vertical (j) address multiplexer 74 for the frame store 9, for a write multiplexer 78 selecting the one of the frame stores 0 and 1 to be written with the video samples serially read from the PISO register 66, and for a read multiplexer 79 selecting the one of the frame stores 0 and 1 to be read to the video monitor 23.

When the counter 70 count is ZERO, the multiplexers 71 and 72 select the sum output signals from the adders 68 and 69 as random-access horizontal (i) and vertical (j) write addresses for the frame store 8; and the multiplexers 73 and 74 select raster-scanned horizontal (i) and vertical (j) write addresses from the horizontal digital scan generator 64 and from the vertical digital scan generator 65, respectively, for application to the frame store 9. The write multiplexer 75 selects the randomly-accessed frame store 8 to be written with the video samples read serially from the PISO register 66. The read multiplexer 76 selects video samples read from the frame store 9 for reading to the video monitor 23.

When the counter 70 count is ONE, the multiplexers 71 and 72 select the sum output signals from the adders 68 and 69 as random-access horizontal (i) and vertical (j) write addresses for the frame store 9; and the multiplexers 73 and 74 select raster-scanned horizontal (i) and vertical (j) write addresses from the horizontal digital scan generator 64 and from the vertical digital scan generator 65, respectively, for application to the frame store 8. The write multiplexer 75 selects the randomly-accessed frame store 9 to be written with the video samples read serially from the PISO register 66. The read multiplexer 76 selects video samples read from the frame store 8 for reading to the video monitor 23.

Figure 10:
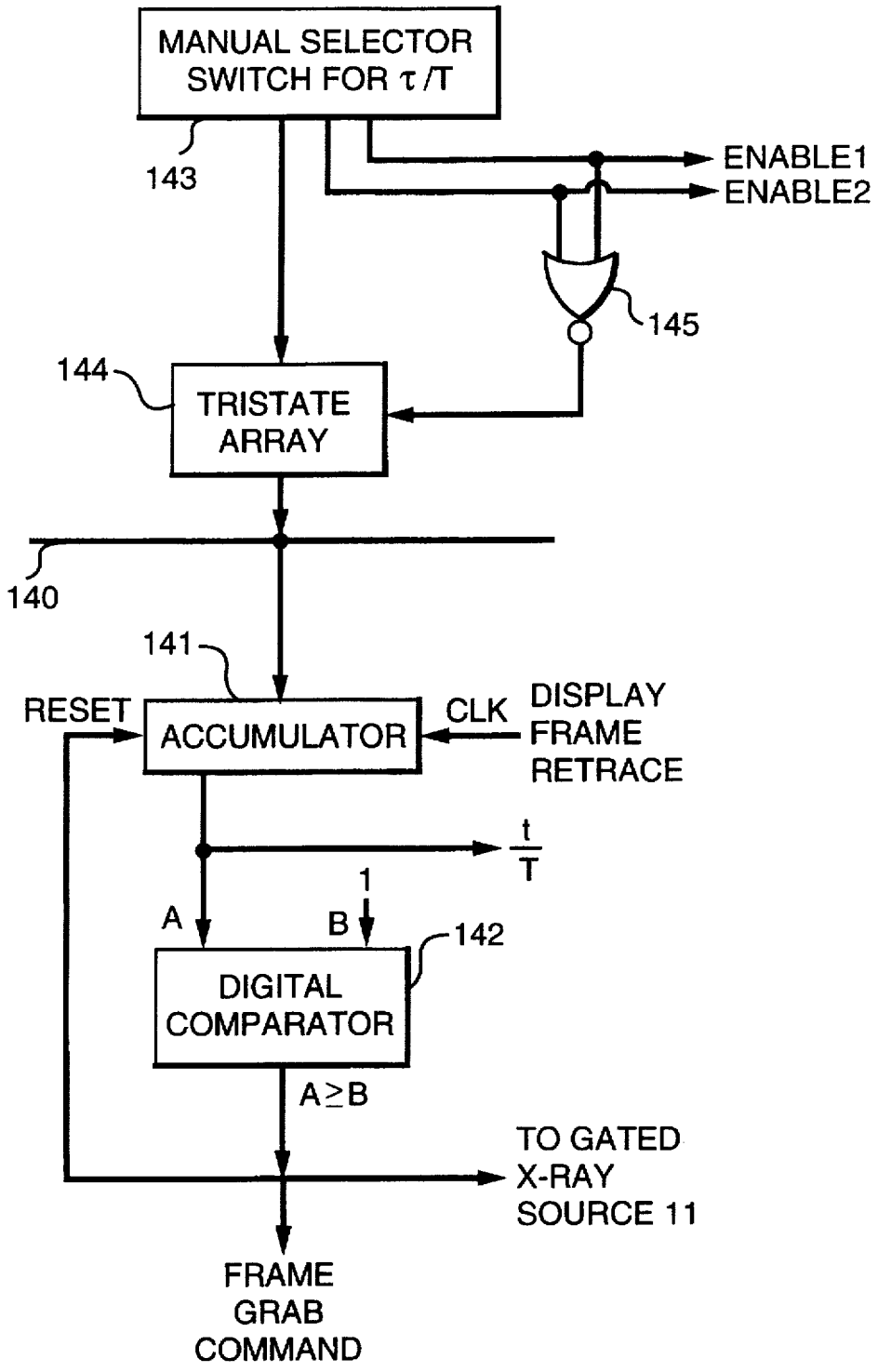
FIG. 10 is a schematic diagram of circuitry as can be included within the master control circuitry of the FIG. 1 fluoroscopic apparatus, to control the rate at which x-ray exposure and frame grabbing are performed.

FIG. 10 shows a portion of the master control circuitry 2. A digital bus 140 has a $\tau/T$ value asserted thereon, which $\tau/T$ value is a rounded-upward binary-number fraction that is the reciprocal of an integer descriptive of the number of frames displayed by the video monitor 23 for each frame grabbed from the video camera 5 because of its recording an x-ray exposure by the gated x-ray source 11. An accumulator 141, reset to arithmetic zero each time a FRAME GRAB COMMAND signal is ONE and clocked by display frame (vertical) retrace pulses, accumulates the $\tau/T$ value asserted on the digital bus 140 to generate an accumulator output signal $t/T$ to be supplied to the pixel displacement computer 5 (or 95). A digital comparator 142 compares the accumulator output signal $t/T$ to unity, putting out a FRAME GRAB COMMAND signal that is ONE only when $t/T$ equals or exceeds unity. This ONE not only resets the accumulator 141, but gates the x-ay source 11 to deliver its pulsed [x-ray] *x-ray* radiation 10. Furthermore, in the read/write control circuitry 6 for camera memory in the FIG. 1 fluoroscopic apparatus, this ONE ANDs with the frame grab count from the counter 27 and bank selection signals to write selected banks of the frame store 1; and this ONE ANDs with the complemented frame grab count from the counter 27 and bank selection signals to write selected banks of the frame store 0.

FIG. 10 shows how a value $\tau/T$ selected by a manual selector switch 143, such as multiple-pole-multiple-position rotary switch, can be selectively asserted on the digital bus 140. T is the time between corresponding pixels in successive grabbed frames, and $\tau$ is the time between corresponding pixels in successive display frames. A plurality of the poles of the selector switch 143 supply respective bits of the manually selected value of $\tau/T$ to be conditionally asserted on the digital bus 140 by an array 144 of tristates, responsive to their receiving a ONE from a NOR gate 145. Additional poles of the selector switch 143 supply respective ZEROs as input signals to the NOR gate 145 when a manually selected value of $\tau/T$ is to asserted on the digital bus 140. When a value of $\tau/T$ automatically determined by a portion of the master control circuitry 2 is to be used, as determined by a setting of the manual selector switch 143, an ENABLE1 signal from an additional pole of the switch 143 is selected to be ONE to serve as an enabling signal for that portion of the master control circuitry 2 automatically determining the value of $\tau/T$. When a value of $\tau/T$ automatically determined by another portion of the master control circuitry 2 is to be used, as determined by a setting of the manual selector switch 143, an ENABLE2 signal from another additional pole of the switch 143 is selected to be ONE to serve as an enabling signal for that other portion of the master control circuitry 2 automatically determining the value of $\tau/T$. Either the ENABLE1 or the ENABLE2 signal being a ONE conditions the NOR gate 145 to supply a ZERO to the array 144 of tristates, conditioning them to be in their high-output-impedance state so their respective output conditions do not affect the automatically determined value of $\tau/T$ asserted on the digital bus 140 by that portion of the master control circuitry 2 enabled to do so. The manual selector switch 143 may have its setting for non-automatic operation labelled in time units. Alternatively, to avoid the operator having to refer to a table of setting for particular types of observation, the manual selector switch 143 may have each of its setting for non-automatic operation labelled in terms of the particular types of observation for which that setting is appropriate.

Figure 11:
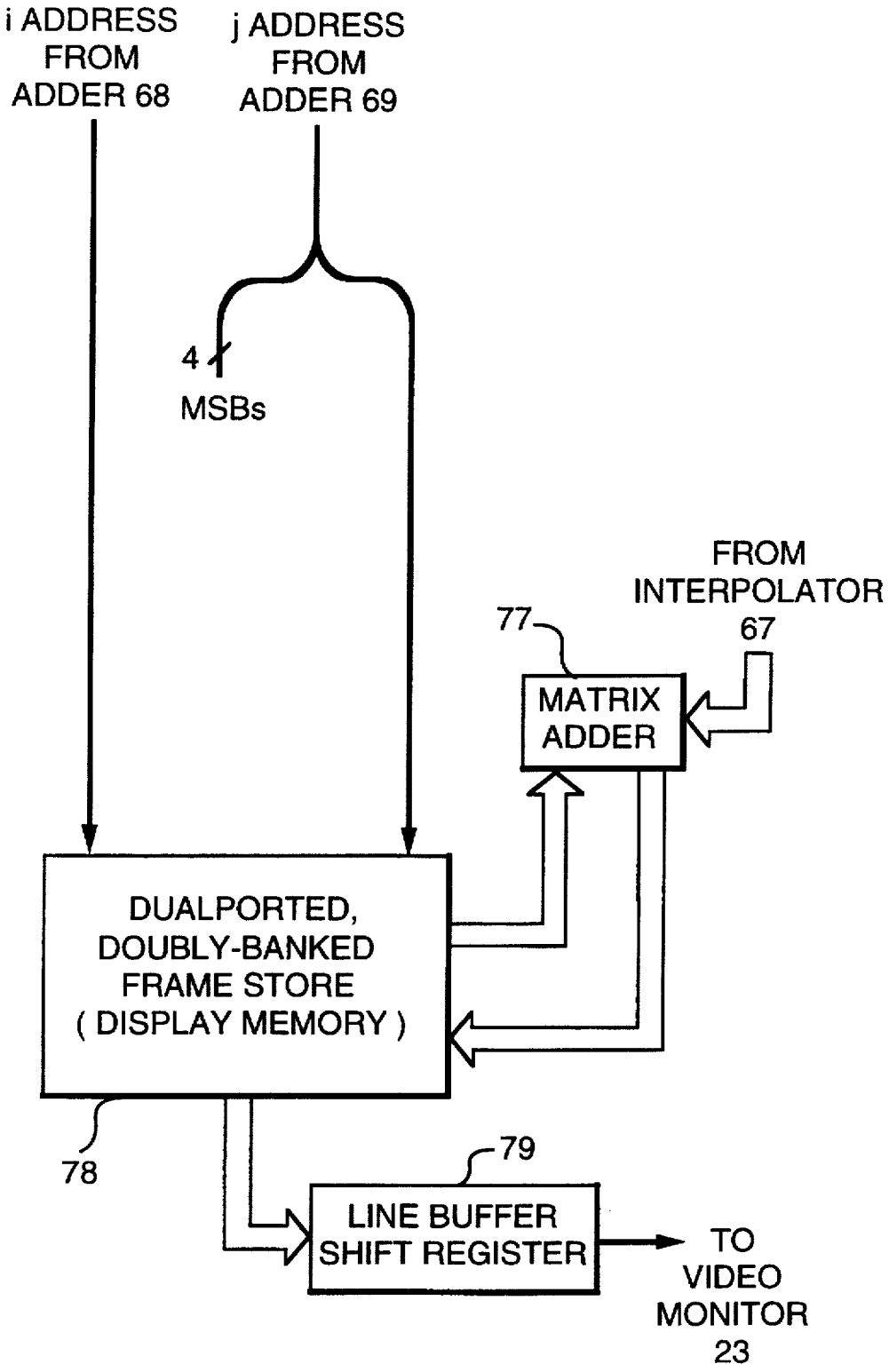
FIG. 11 is a schematic diagram of an alterative way of generating display information from stored camera samples, which provides a saving in display memory requirements and may be used in modified FIG. 1 fluoroscopic apparatus, to be used to implement the method of the invention.

FIG. 11 shows a modification that can be made to the FIG. 1 fluoroscopic apparatus, which modification reduces the amount of display memory required. The frame stores 8 and 9 are dispensed with in favor of a dual-ported random-access memory 78. Here, "dual-ported" means that the RAM 78 has, in addition to the customary read/write port a read-only port through which read-only port a line of memory data loaded in parallel into a parallel-in/serial-out register within the RAM 78 may be serially unloaded at a relatively high reading rate.

The multiplexers 70–76 are also dispensed with. Video samples supplied serially to the random-access read/write port of the RAM 78 are written into RAM 78. During each line retrace interval in the active portions of the frame, a completely written scan line of video samples is read out through the read-only serial port for the dual-ported RAM 78 at a multiple (e.g., eight) times normal pixel scan rate, to load serially a line-buffer shift register 79. In the ensuring line trace interval, the line-buffer shift register 79 is serially unloaded at normal pixel scan rate, to supply video samples to the the video monitor 23.

RAM 78 only needs to store part of a frame of successive video signal samples. RAM 78 is written into during both even and odd display frames. Assuming RAM 78 only stores part of a frame, RAM 78 is randomly addressed in the i direction by the sum output signal of the adder 68 and in the j direction by all but the most significant few bits of the sum output signal of the adder 69. For example, since the number of full pixels of displacement in the $\Delta j$ component of the displacement vector is not expected to exceed five or so, RAM 78 needs only to store sixteen lines of video samples, and may be addressed on a wrap-around basis using all except the four most significant bits of the sum output signal of the adder 69 (assuming the vertical scan generator 65 output signal to be unsigned).

Thusfar in this specification, $t/T$ has tacitly been assumed to be constant-valued, as would be the case if the video camera 5 frames were grabbed at a uniform rate corresponding to an x-ray exposure rate that was a fixed fraction of the rate at which frames are displayed by the video monitor 23, so the one-exposure-per-camera frame dose the patient 13 receives from the gated x-ray source 11 is accordingly reduced. As long as there is no appreciable motion of the x-ray image from one grabbed frame to the next, this reduced frame grab rate is acceptable, since the frame filling procedures described above satisfactorily provide the successive frames of video samples needed by the video monitor 23. When the x-ray image exhibits more motion, video samples sufficiently current that reliable motion estimates can be made are no longer available. Also, the background pixels coming out of the [eclipse] *ellipse* of foreground objects that are particularly subject to error tend to become too large in number to escape the notice of a person viewing the video monitor 23. To keep these problems from becoming severe, it is desirable to be able to grab camera frames containing x-ray image samples at increased rate and thus decrease T, which is inversely related to the rate of grabbing camera frames containing x-ray image samples.

Figure 12:
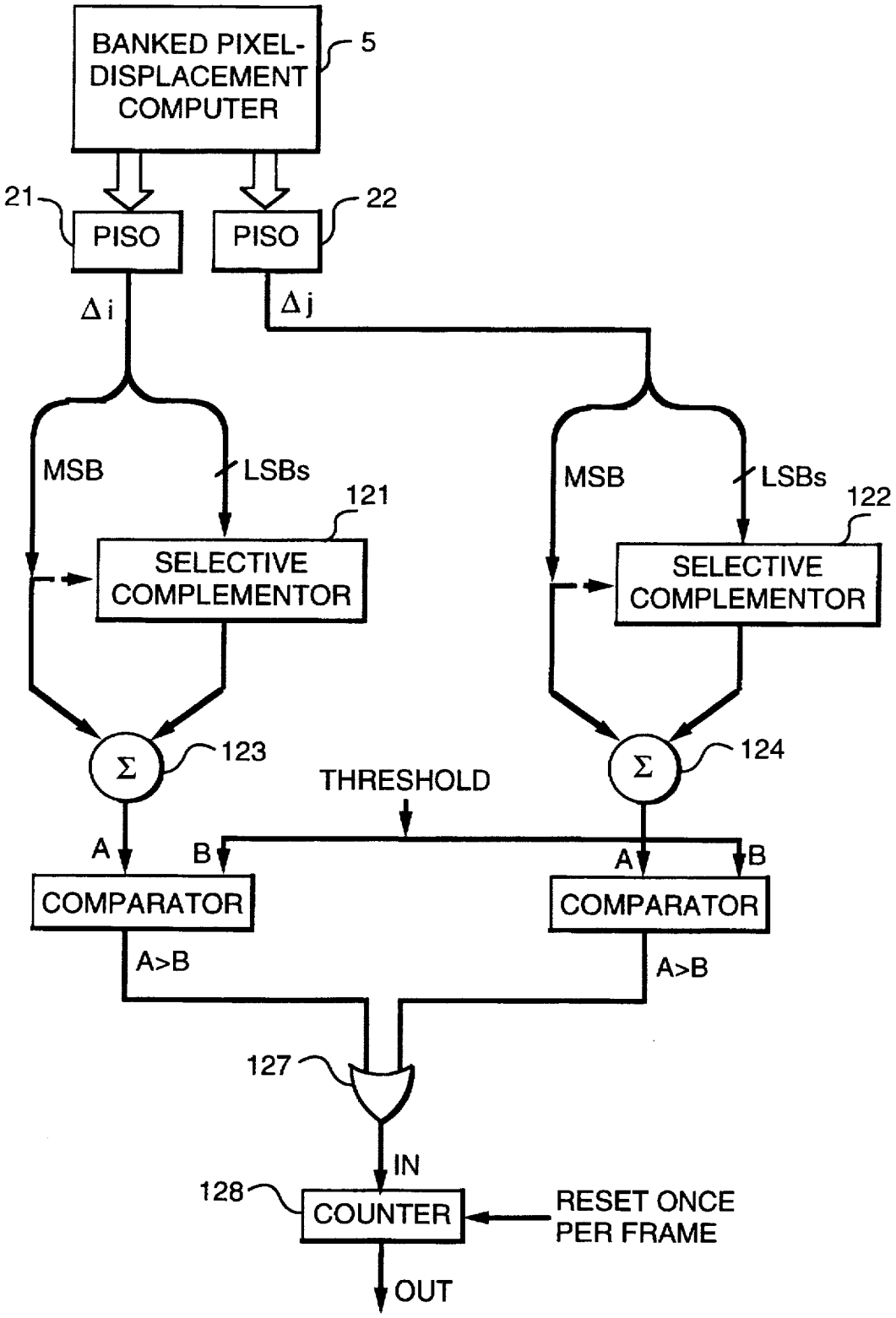
FIG. 12 is a schematic diagram of apparatus that can be used for evaluating the amount of frame-to-frame change in successive fluoroscopic images generated in the FIG. 1 fluoroscopic apparatus.

FIG. 12 shows circuitry for determining that there is excessive motion between camera-originated frames, as indicates that there should be an increase in the rate that video camera 5 frames containing x-ray image samples are grabbed. When there is a large amount of motion in images, there will be an increase in the number of pixels having a large amplitude pixel displacement vector associated therewith. By counting the number of pixels that occur in a frame which pixels have a "large" amplitude pixel displacement vector, a measure of the interframe motion can be obtained. An adequate approximation of this measure of interframe motion can be obtained, without having to take the vector sums of the respective $\Delta i$ and $\Delta j$ displacement components for each pixel, by counting the number of times in a frame that at least one of the $\Delta i$ and $\Delta j$ components of pixel displacement has an amplitude that exceeds a threshold value. This is the procedure the FIG. 12 circuitry implements.

The absolute value of $\Delta i$ is obtained by [striping] *stripping* its most significant sign bit and using the stripped sign bit to cause a selective complementor 121 to complement the less significant bits of $\Delta i$ when the stripped sign bit is a ONE. A digital adder 123 adds the selectively complemented less significant bits of $\Delta i$ to the stripped sign bit to generate, as the sum output signal from adder 123, the absolute value of $\Delta i$. The absolute value of $\Delta i$ is compared to a threshold value in a digital comparator 125. Only when the absolute value of $\Delta i$ exceeds the threshold value, does the comparator 125 supply a ONE output signal to a two-input OR gate 127.

The absolute value of $\Delta j$ is obtained by stripping its most significant sign bit and using the stripped sign bit to cause a selective complementor 122 to complement the less significant bits of $\Delta j$ when the stripped sign bit is a ONE. A digital adder 124 adds the selectively complemented less significant bits of $\Delta j$ to the stripped sign bit to generate, as the sum output signal from adder 124, the absolute value of $\Delta j$. The absolute value of $\Delta j$ is compared to a threshold value in a digital comparator 126. Only when the absolute value of $\Delta j$ exceeds the threshold vale, does the comparator 126 supply a ONE output signal to the OR gate 127.

Responsive to either of its input signals being a ONE indicative of the absolute value of $\Delta i$ or the absolute value of $\Delta j$ exceeding threshold value, the OR gate 127 outputs a ONE to the count input port of a digital counter 128. The digital counter 128 is reset to zero count after the initial scanning of a grabbed frame, before resetting providing a count indicative of the motion content in the most recently grabbed frame.

Figure 13:
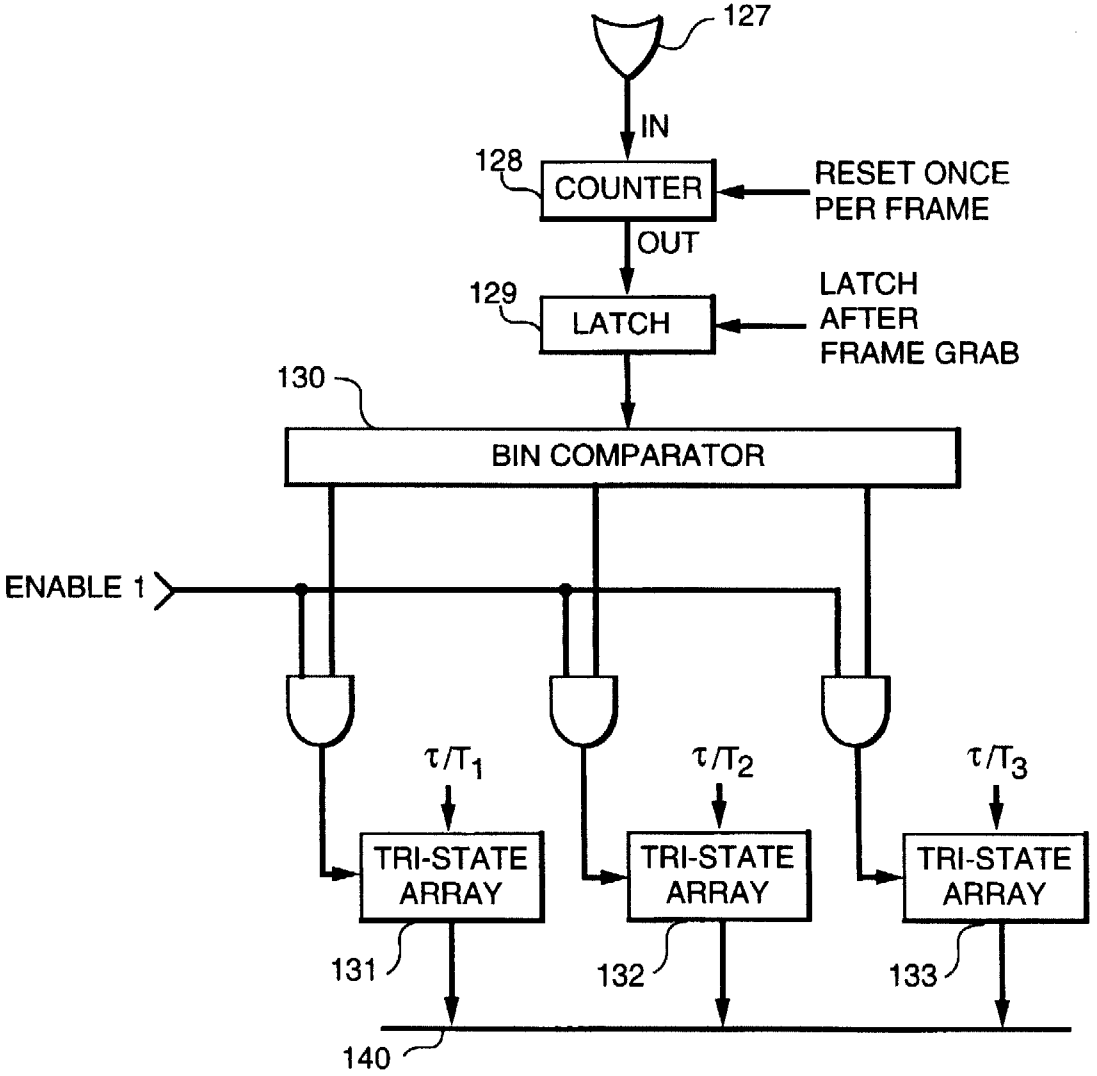
FIG. 13 is a schematic diagram of image timing apparatus as can be used in the FIG. 1 fluoroscopic apparatus for responding to indications of excessive amounts of frame-to-frame change in successive fluoroscopic images to increase the rate at which fluoroscopic images are obtained, to implement a further aspect of the invented method.

FIG. 13 shows circuitry for responding to this count to adjust the gating rate of the x-ray source 11 and of frame grabbing of video camera 5 video output signal. A latch 129 latches the count indicative of the motion content in the most recently grabbed frame, to provide the input signal of a bin comparator 130. The bin comparator 130 determines which of a plurality of successively higher ranges the latched count falls, putting a ONE out from a corresponding bin output port and putting a ZERO out from the other bin output ports. A ONE for a first bin output port of the bin comparator 130 as ANDed with an ENABLE1 signal that is ONE causes an array 131 of tristates to assert a value $\tau/T_1$ on a digital bus 140; a ONE from a second bin output port of the bin comparator 130 as ANDed with an ENABLE1 signal that is ONE cause an array 132 of tristates to assert a value of $\tau/T_2$ on the digital bus 140; a ONE from a third bin output port of the bin comparator 130 as ANDed with an ENABLE1 signal that is ONE causes an array 133 of tristates to assert a $\tau/T_3$ on the digital bus 140; and this procedure may be extended to as many bin output ports as a designer wishes.

When fluoroscopically viewing certain organs—for example, the heart—there may be times that there is considerable motion from display frame to display frame, but it is not of much value for diagnostic purposes. Automatically controlling the x-ray-exposure and frame-grabbing rate as just described in connection with FIGS. 12 and 13 may call for more x-ray exposures than needed. This is particularly so since some tendency to too frequently expose must be built into the automatic control if it is to be able to adjust quickly enough to rapid increases in the motion rate of the organ being observed, rapidity being measured respective to display frame rate. At the same time, a manual setting of x-ray-exposure and frame-grabbing rate that provides lower radiation dosage will result in an insufficient number of x-ray exposures (and associated frame grabs) during the intervals of diagnostic value. A solution to this problem is available when the motion in the medical image can be predicted. In the case of the heart, motion is cyclic in nature, and the intervals of greatest diagnostic value are just before and just after the heart is electrically stimulated to make its major contraction.

Figure 14:
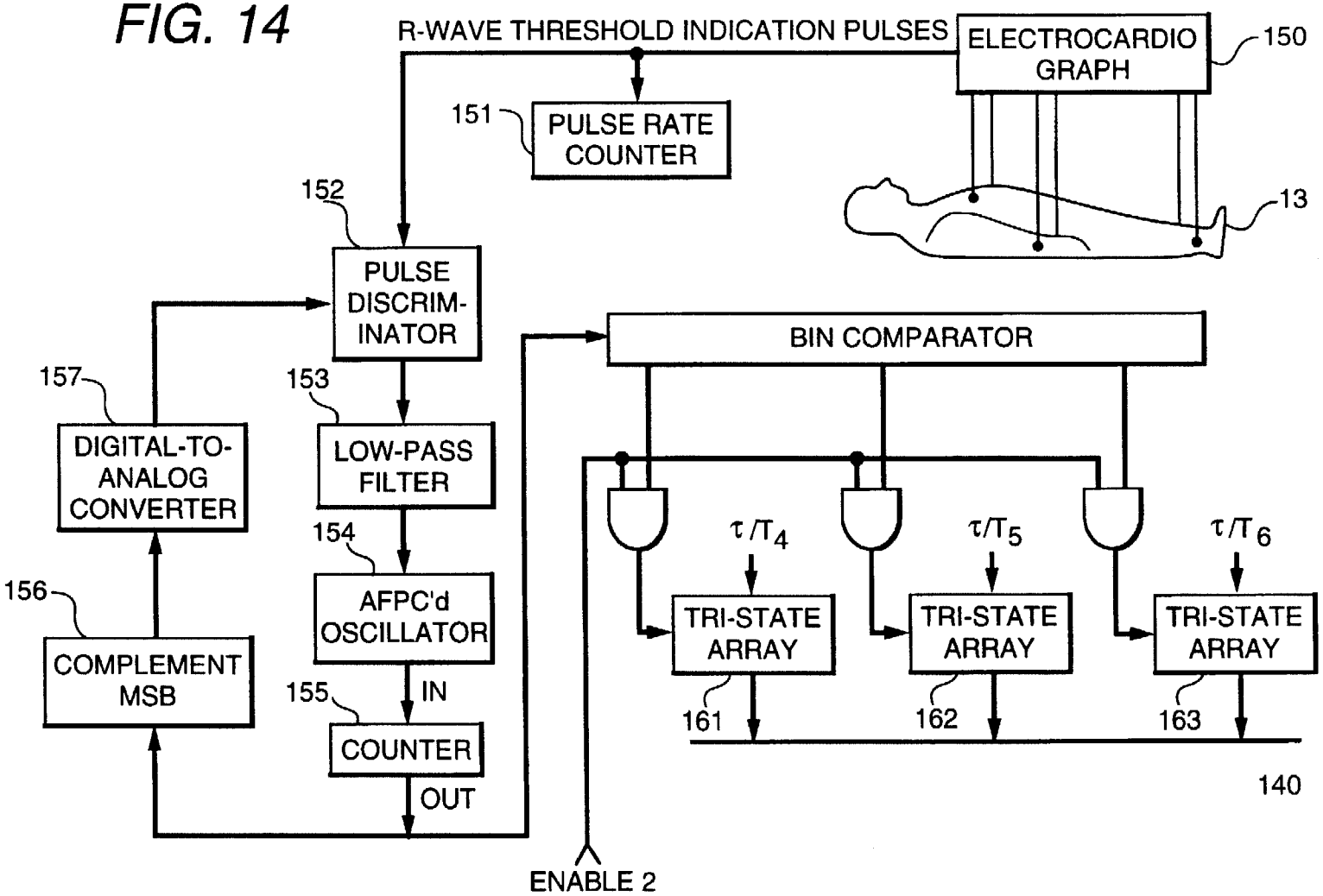
FIG. 14 is a schematic diagram of other image timing apparatus as can be used in the FIG. 1 fluoroscopic apparatus for controlling the rate at which fluoroscopic images are obtained, in accordance with a still further aspect of the invented method.

As shown in FIG. 14, an electrocardiograph 150 is conventionally used to monitor the heart of the patient 13, supplying a pulse to a pulse rate counter 151 each time the heart is electrically stimulated to make its major contraction. These pulses are called "R-wave threshold indications". Where the same patient 13 is being fluoroscoped by the FIG. 1 fluoroscopic apparatus as further shown in FIG. 14, the R-wave threshold indications from the electrocardiograph 150 may be used to control the rate of x-ray exposure from the gated x-ray source 11 and of the frame grabbing from the video camera 5. The R-wave threshold indication pulses are supplied to a pulse discriminator 152 that is also supplied a sawtooth waveform of a frequency and a phase which are to be locked by a feedback to correspond to those of the pulse rate indications from the electrocardiograph 150. Error signals generated by departures from the desired lock are integrated in a low-pass filter 152 and applied as automatic frequency and phase control (AFPC) signal to an oscillator 154. The oscillator 154 is to be locked so it provides oscillations at a high multiple of the pulse rate from electrocardiograph 150. The oscillator 154 supplies output pulses at a rate related to its oscillation frequency (e.g. one half) for counting in a digital counter 155 to generate a sampled-data digital description of a sawtooth wave. The counter 155 is a multi-stage binary counter reset on reaching full count less one. Circuitry 156 complements the most significant bit of the count from the counter 155, thereby to suppress the direct component of the sawtooth as converted to analog voltage form by a digital-to-analog converter 157. The analog sawtooth voltage from the digital-to-analog converter 157 is applied to the pulse discriminator 152 to complete the automatic frequency and phase control loop controlling the oscillations of the oscillator 154.

The count from the counter 155 charts the timing of the cyclic operation of the heart of the patient 13. This timing information is supplied to a bin comparator 160 to determine in what portion of the cycle of heart operation the heart of the patient 13 is. A ONE for a first bin output port of the bin comparator 160 as ANDed with an ENABLE1 signal that is ONE cause an array 161 of tristates to assert a value $\tau/T_4$ on a digital bus 140; a ONE from a second bin output port of the bin comparator 160 as ANDed with an ENABLE1 signal that is ONE causes an array 162 of tristates to assert a value of $\tau/T_5$ on the digital bus 140; a ONE from a third bin output port of the bin comparator 160 an ANDed with an ENABLE1 signal that is ONE causes an array 136 of tristates to assert a $\tau/T_6$ on the digital bus 140; and this procedure may be extended to as many bin output ports as a designer wishes.

The use of the electrocardiograph to indicate when x-ray exposures should be made also eliminates need for one or more learning periods in which to determine automatically an appropriate sequence of x-ray exposures. $T_4$, $T_5$ and $T_6$, the lengths of time between grabbing frames as may be set by the FIG. 14 apparatus may correspond wholely, in part or not at all with $T_1$, $T_2$ and $T_3$, the lengths of time between grabbing frames as may be set by the FIG. 13 apparatus.

Figure 15:
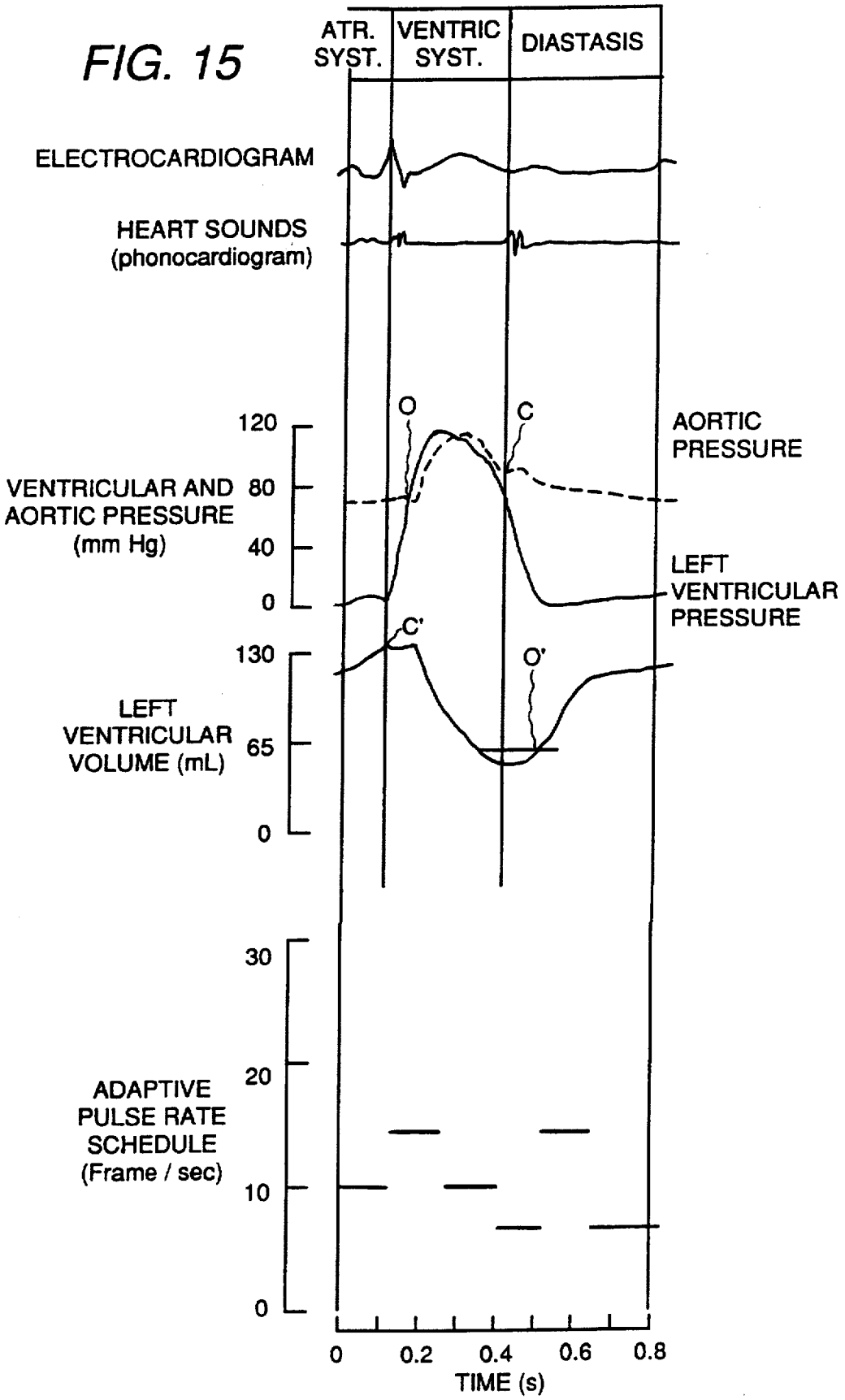
FIG. 15 is a timing diagram useful in understanding the operation of the FIG. 14 timing apparatus for controlling therate at which fluoroscopic images are obtained.

FIG. 15 is a timing diagram that helps in understanding how the gated x-ray tube pulse rate can be nonuniformly varied based on knowledge of the various phases that the ventricular muscle endures during one heart cycle. The procedure diagrammed in FIG. 15 pertains to studying the ventricular volume profile. The top portion of the figure, shows five types of sensory signals from which the pulse-rate schedule for each cardiac cycle, as shown at the bottom of the figure, can be determined. Each of these five signals is plotted against the same time scale, shown at the bottom of FIG. 15. As indicated at the top of FIG. 15, the atrial systole lasts for about 0.1 seconds and is followed by a ventricular systole that lasts for about 0.3 seconds thereafter. The diastole, which lasts the remaining 0.4 seconds of the cycle follows ventricular systole.

The two uppermost signals graphed over this cycle are electrocardiograph (ECG) reading and heart sounds, which both belong to the class of noninvasive sensor signals. The next lower signals are aortic pressure, ventricular pressure and left ventricular volume, all of which belong to the class of invasive sensor signals. These five signals reflect the five activity phases that take place within the ventricle during the cardiac cycle.

The first phase of ventricular motion, at the beginning of the ventricular systole is called isovolumetric ventricular contraction. This phase is characterized by slow motion of the ventricular wall and thus a rate of 10 pulses/second can be assigned to that phase which lasts for approximately 0.12 seconds. Point C' in the left ventricular volume signal marks the closing of the mitral valve at the conclusion of the first phase, at which point ventricular pressure begins to rise.

The second phase of ventricular motion, namely ventricular ejection, is characterized by fast wall motion for the first 0.12 seconds, then a slight slowing for the following 0.1 seconds. Pulse rate can be set at 15 pulses/second or left at the normal 30 pulses/second for the first 0.12 seconds of the second phase. Point O in the aortic pressure curve marks the opening of the aortic valve after the first 0.12 seconds of the second phase. Thereafter, a reduced rate of 10 pulses/second suffices to capture the ventricular activity for the last slower portion of the second phase. Point C in the aortic pressure curve marks the closing of the aortic valve at the end of the second phase of ventricular motion.

The third phase of ventricular motion is called isovolumetric ventricular relaxation, during which hardly any motion of the ventricular wall takes place for about 0.12 seconds, during which a pulse rate of 7.5 pulses/seconds is sufficient. The mitral valve opening is at point O' in the left ventricular volume signal.

The fourth phase of ventricular motion, namely ventricular filling, is characterized by fast high ventricular activity lasting for approximately 0.18 seconds leading to a tube pulse rate of 15 frames/second being required (30 pulses/second can be used for the first 0.1 seconds of this phase).

The last phase of ventricular motion marks the end of ventricular relaxation and end of diastole where the ventricle hardly moves, thus a rate of 7.5 pulses/second can be maintained for this phase lasting for approximately 0.23 seconds. Adopting the above X-ray tube pulse-rate schedule allows approximately a 3:1 reduction in the number of gate x-ray tube pulses compared to a current pulsed-fluoro machine that does not use this approach. This pulse rate reduction translates to substantially the same reduction factor in the amount of radiation.

The phases described above can be determined by simple (or adaptive) thresholding of the ventricular and aortic pressure signals or any of the other sensory signals. In addition, provisions will always be taken to revert to the x-ray tube original pulse rate (30 pulses/second) if a fault in detecting any of the phase should occur.

What is claimed is:

[1. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be gated on for intervals not as long as a display frame, a fluoroscopic camera including a raster-scanning video camera and x-ray-to-light conversion apparatus with persistence not appreciably longer than a display frame, and frame filling apparatus for grabbing frames of image samples and interpolating between successively grabbed frames of image samples when necessary to generate frames of image samples at said display frame rate; said method comprising the steps of:

during selected ones of said successive frame scan intervals interspersed among others of said successive frame scan intervals, directing x-ray radiation from said gated x-ray source through said living creature;

during at least said selected ones of said successive frame scan intervals, viewing with said fluoroscopic camera the x-ray shadow of at least a portion of said living creature;

arranging that said frame filling apparatus grabs frames of image samples from said raster-scanning video camera during said selected frame scan intervals; and continuously supplying to said video monitor the frames of image samples generated at said display frame rate of said frame filling apparatus.]

[2. A method as set forth in claim 1 including the additional step of:

choosing the frequency of selecting ones of said successive frame scan intervals in which to direct x-ray radiation from said gated x-ray source through said living creature, in accordance with the speeds of motion to be expected in the portion of said living creature subject to fluoroscopic observation, to be as low as possible consistent with clinical value being preserved and with motion flicker in the fluoroscopic observation being satisfactorily low.]

[3. A method as set forth in claim 1 including the additional steps of:

monitoring the degree of change between frames of image samples grabbed by said frame filling apparatus during successive ones of said selected frame scan intervals; and responding to that degree of change being outside a prescribed range to change the frequency of selecting ones of said successive frame scan intervals in which to direct x-ray radiation from said gated x-ray source through said living creature, said change in frequency being in a direction tending to reduce the degree of change between frames of image samples grabbed by said frame filling apparatus during successive ones of said selected frame scan intervals.]

4. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be gated on for intervals not as long as a display frame, a fluoroscopic camera including a raster-scanning video camera and x-ray-to-light conversion apparatus with persistence not appreciably longer than a display frame, and frame filling apparatus for grabbing frames of image samples and interpolating between successively grabbed frames of image samples when necessary; said method comprising the steps of:

during selected ones of said successive frame scan intervals, interspersed among others of said successive frame scan intervals identifiable as respective fill frame scan intervals for each of which a respective fill frame of image samples is to be generated, directing x-ray radiation from said gated x-ray source through said living creature;

during at least said selected ones of said successive frame scan intervals, viewing with said fluoroscopic camera the x-ray shadow of at least a portion of said living creature;

during said selected frame scan intervals, grabbing frames of image samples from said raster-scanning video camera with said frame filling apparatus during said selected frame scan intervals;

during said selected frame scan intervals, calculating for each image sample the displacement velocity and acceleration of the corresponding picture element;

during each fill frame scan interval, calculating for each image sample the displacement of the corresponding picture element in that respective fill frame from its location in a reference grabbed frame, proceeding from the displacement velocity and acceleration calculated for that corresponding picture element;

during each fill frame scan interval, responsive to its calculated displacement re-mapping each picture element as taken from its spatial location in said reference grabbed frame to its spatial location in the current fill frame, thereby to generate a frame of image samples for that fill frame scan interval; and continuously supplying to said video monitor at said display frame rate frames of image samples, including the grabbed frames of image samples as interspersed with fill frames generated by said frame filling apparatus.

5. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be grated on for intervals not as long as a display frame, a fluoroscopic camera including a raster-scanning video camera and x-ray-to-light conversion apparatus with persistence not appreciably longer than a display frame, frame filling apparatus for grabbing frames of image samples and interpolating between successively grabbed frames of image samples when necessary to generate frames of image samples at said display frame rate, and monitoring apparatus suited for monitoring by direct or indirect means motion in a portion of said living creature of particular interest in a current fluoroscopic observation; said method comprising the steps of:

using said monitoring apparatus to monitor motion in said portion of said living creature of particular interest in the current fluoroscopic observation;

responding to that monitored motion to select in which of said successive frame scan intervals to direct x-ray radiation from said gated x-ray source through said living creature, so as to select from said successive frame scan intervals more frequently during times of increased motion in said portion of said living creature of particular interest in the current fluoroscopic observation, and so as to select from said successive frame scan intervals less frequently during times of increased motion in said portion of said living creature of particular interest in the current fluoroscopic observation;

during the thus selected ones of said successive frame scan intervals, directing x-ray radiation from said gated x-ray source through said living creature;

during at least said selected ones of said successive frame scan intervals, viewing with said fluoroscopic camera the x-ray shadow of at least a portion of said living creature;

arranging that said frame filling apparatus grabs frames of image samples from said raster-scanning video camera during said selected frame scan intervals; and continuously supplying to said video monitor the frames of image samples generated at said display frame rate by said frame filling apparatus.

6. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be gated on for intervals not as long as a display frame, a fluoroscopic camera including a raster-scanning video camera and x-ray-to-light conversion apparatus with persistence not appreciably longer than a display frame, and frame filling apparatus for grabbing frames of image samples and interpolating between successively grabbed frames of image samples when necessary; said method comprising the steps of:

during selected ones of said successive frame scan intervals, interspersed among others of said successive frame scan intervals identifiable as respective fill frame scan intervals for each of which a respective fill frame of image samples is to be generated, directing x-ray radiation from said gated x-ray source through said living creature;

During at least said selected ones of said successive frame scan intervals, viewing with said fluoroscopic camera the x-ray shadow of at least a portion of said living creature;

during said selected frame scan intervals, grabbing frames of image samples from said raster-scanning video camera with said frame filling apparatus during said selected frame scan intervals;

during said selected frame scan intervals, calculating for each image sample the displacement velocity of the corresponding picture element:

during each fill frame scan interval, calculating for each image sample the displacement of the corresponding picture element in that respective fill frame from its location in a reference grabbed frame, proceeding from the displacement velocity calculated for that corresponding picture element;

during each fill frame scan interval, responsive to its calculated displacement re-mapping each picture element as taken from its spatial location in said reference grabbed frame to its spatial location in the current fill frame, thereby to generate a frame of image samples for that fill frame scan interval; and continuously supplying to said video monitor at said display frame rate frames of image samples, including the grabbed frames of image samples as interspersed with fill frames generated by said frame filling apparatus.

7. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be gated on for intervals not as long as a display frame, a fluoroscopic camera including a raster-scanning video camera and x-ray-to-light conversion apparatus with persistence not appreciably longer than a display frame, and frame filling apparatus for grabbing frames of image samples and determining from differences between successively grabbed frames of image samples and from closeby samples in each said successively grabbed frame of image samples any changes to be made from said successively grabbed frames of image samples in order to generate frames of image samples at said display frame rate therefrom; said method comprising the steps of:

during selected ones of said successive frame scan intervals interspersed among others of said successive frame scan intervals, directing x-ray radiation from said gated x-ray source through said living creature;

during at least said selected ones of said successive frame scan intervals, viewing with said fluoroscopic camera the x-ray shadow of at least a portion of said living creature;

arranging that said frame filling apparatus grabs frames of image samples from said raster-scanning video camera during said selected frame scan intervals; and continuously supplying to said video monitor the frames of image samples generated at said display frame rate by said frame filling apparatus.

8. A method as set forth in claim 7 including the additional step of:

choosing the frequency of selecting ones of said successive frame scan intervals in which to direct x-ray radiation from said gated x-ray source through said living creature, in accordance with the speeds of motion to be expected in the portion of said living creature subject to fluoroscopic observation, to be as low as possible consistent with clinical value being preserved and with motion flicker in the fluoroscopic observation being satisfactorily low.

9. A method as set forth in claim 7 including the additional steps of:

monitoring the degree of change between frames of image samples grabbed by said frame filling apparatus during successive ones of said selected frame scan intervals; and responding to that degree of change being outside a prescribed range to change the frequency of selecting ones of said successive frame scan intervals in which to direct x-ray radiation from said gated x-ray source through said living creature, said change in frequency being in a direction tending to reduce the degree of change between frames of image samples grabbed by said frame filling apparatus during successive ones of said selected frame scan intervals.

10. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be gated on for intervals not as long as a display frame, a fluoroscopic camera including a raster-scanning video camera and x-ray-to-light conversion apparatus with persistence not appreciably longer than a display frame, and frame filling apparatus for grabbing frames of image samples and determining from differences between successively grabbed frames of image samples and from closeby samples in each said successively grabbed frame of image samples any changes to be made from said successively grabbed frames of image samples in order to generate frames of image samples at said display frame rate therefrom; said method comprising the steps of:

during selected ones of said successive frame scan intervals, interspersed among others of said successive frame scan intervals identifiable as respective fill frame scan intervals for each of which a respective fill frame of image samples is to be generated, directing x-ray radiation from said gated x-ray source through said living creature;

during at least said selected ones of said successive frame scan intervals, viewing with said fluoroscopic camera the x-ray shadow of at least a portion of said living creature;

during said selected frame scan intervals, grabbing frames of image samples from said raster-scanning video camera with said frame filling apparatus during said selected frame scan intervals;

during said selected frame scan intervals, calculating for each image sample its temporal gradient and its spatial gradients in directions parallel to and perpendicular to scan lines;

during each frame scan interval immediately following one of said selected frame scan intervals, calculating for each image sample the displacement velocity of the corresponding picture element;

during each fill frame scan interval, calculating for each image sample the displacement of the corresponding picture element in that respective fill frame from its location in a reference grabbed frame, proceeding from the displacement velocity calculated for that corresponding picture element;

during each fill frame scan interval, responsive to its calculated displacement re-mapping each picture element as taken from its spatial location in said reference grabbed frame to its spatial location in the current fill frame, thereby to generate a frame of image samples for that fill frame scan interval; and continuously supplying to said video monitor at said display frame rate frames of image samples, including the grabbed frames of image samples as interspersed with fill frames generated by said frame filling apparatus.

11. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be gated on for intervals not as long as a display frame, a fluoroscopic camera including a raster-scanning video camera and x-ray-to-light conversion apparatus with persistence not appreciably longer than a display frame, and frame filling apparatus for grabbing frames of image samples and determining from differences between successively grabbed frames of image samples and from closeby samples in each said successively grabbed frame of image samples any changes to be made from said successively grabbed frames of image samples in order to generate frames of image samples at said display frame rate therefrom; said method comprising the steps of:

during selected ones of said successive frame scan intervals, interspersed among others of said successive frame scan intervals identifiable as respective fill frame scan intervals for each of which a respective fill frame of image samples is to be generated, directing x-ray radiation from said gated x-ray source through said living creature;

during at least said selected ones of said successive frame scan intervals, viewing with said fluoroscopic camera the x-ray shadow of at least a portion of said living creature;

during said selected frame scan intervals, grabbing frames of image samples from said raster-scanning video camera with said frame filling apparatus during said selected frame scan intervals;

during said selected frame scan intervals, calculating for each image sample its temporal gradient and its spatial gradients in directions parallel to and perpendicular to scan lines;

during each frame scan interval immediately following one of said selected frame scan intervals, calculating for each image sample the displacement velocity and acceleration of the corresponding picture element;

during each fill frame scan interval, calculating for each image sample the displacement of the corresponding picture element in that respective fill frame from its location in a reference grabbed frame, proceeding from the displacement velocity and acceleration calculated for that corresponding picture element;

during each fill frame scan interval, responsive to its calculated displacement re-mapping each picture element as taken from its spatial location in said reference grabbed frame to its spatial location in the current fill frame, thereby to generate a frame of image samples for that fill frame scan interval; and continuously supplying to said video monitor at said display frame rate frames of image samples, including the grabbed frames of image samples as interspersed with fill frames generated by said frame filling apparatus.

12. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be gated on for intervals not as long as a display frame, a fluoroscopic camera including a raster-scanning video camera and x-ray-to-light conversion apparatus with persistence not appreciably longer than a display frame, frame filling apparatus for grabbing frames of image samples and determining from differences between successively grabbed frames of image samples and from closeby samples in each said successively grabbed frame of image samples the changes to be made from said successively grabbed frames of image samples in order to generate frames of image samples at said display frame rate therefrom, and monitoring apparatus suited for monitoring by direct or indirect means motion in a portion of said living creature of particular interest in a current fluoroscopic observation; said method comprising the steps of:

using said monitoring apparatus to monitor motion in said portion of said living creature of particular interest in the current fluoroscopic observation;

responding to that monitored motion to select in which of said successive frame scan intervals to direct x-ray radiation from said gated x-ray source through said living creature, so as to select from said successive frame scan intervals more frequently during times of increased motion in said portion of said living creature of particular interest in the current fluoroscopic observation, and so as to select from said successive frame scan intervals less frequently during times of increased motion in said portion of said living creature of particular interest in the current fluoroscopic observation;

during the thus selected ones of said successive frame scan intervals, directing x-ray radiation from said gated x-ray source through said living creature;

during at least said selected ones of said successive frame scan intervals, viewing with said fluoroscopic camera the x-ray shadow of at least a portion of said living creature;

arranging that said frame filling apparatus grabs frames of image samples from said raster-scanning video camera during said selected frame scan intervals; and continuously supplying to said video monitor the frames of image samples generated at said display frame rate by said frame filling apparatus.

13. Fluoroscopic apparatus comprising:

a video monitor for displaying frames of image samples received during respective ones of frame scan intervals that regularly and successively occur at a display frame rate sufficiently high that brightness flicker is acceptably low to a human observer;

an x-ray source that can be gated on for intervals not as long as a display frame;

a fluoroscopic camera including a raster-scanning video camera and x-ray-to-light conversion apparatus with persistence not appreciably longer than a display frame; and frame filling apparatus for grabbing frames of image samples supplied from said fluoroscopic camera and determining from differences between successively grabbed frames of image samples and from closeby samples in each said successively grabbed frame of image samples any changes to be made from said successively grabbed frames of image samples in order to generate therefrom frames of image samples at said display frame rate, which frames of image samples at said display frame rate are supplied to said video monitor.

*14. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be gated on for intervals not as long as a display frame, a fluoroscopic camera including a raster-scanning video camera and x-ray-to-light conversion apparatus with persistence not appreciably longer than a display frame; and frame filling apparatus for grabbing frames of image samples and interpolating between successively grabbed frames of image samples when necessary to generate frames of image samples at said display frame rate; said method comprising the steps of:*

*during selected ones of said successive frame scan intervals interspersed among others of said successive frame scan intervals, directing x-ray radiation from said gated x-ray source through said living creature, the frequency of said selected ones of said successive frame scan intervals in which to direct x-ray radiation from said gated x-ray source through said living creature being selected in accordance with the speeds of motion to be expected in the portion of said living creature subject to fluoroscopic observation, to be as low as possible consistent with clinical value being preserved and with motion flicker in the fluoroscopic observation being satisfactorily low;*

*during at least said selected ones of said successive frame scan intervals, viewing with said fluoroscopic camera the x-ray shadow of at least a portion of said living creature;*

*arranging that said frame filling apparatus grabs frames of image samples from said raster-scanning video camera during said selected frame scan intervals; and*

*continuously supplying to said video monitor the frames of image samples generated at said display frame rate by said frame filling apparatus.*

*15. A method for fluoroscopically observing a living creature with reduced x-ray dosage; said method usable with a video monitor for displaying frames of image samples received during respective ones of frame scan intervals that regularly and successively occur at a display frame rate sufficiently high that brightness flicker is acceptably low to a human observer, an x-ray source that can be gated on for intervals not as long as a display frame, a fluoroscopic camera including a raster-scanning video camera and x-ray-to-light conversion apparatus with persistence not appreciably longer than a display frame; and frame filling apparatus for grabbing frames of image samples and interpolating between successively grabbed frames of image samples when necessary to generate frames of image samples at said display frame rate; said method comprising the steps of:*

*during selected ones of said successive frame scan intervals interspersed among others of said successive frame scan intervals, directing x-ray radiation from said gated x-ray source through said living creature;*

*during at least said selected ones of said successive frame scan intervals, viewing with said fluoroscopic camera the x-ray shadow of at least a portion of said living creature;*

*arranging that said frame filling apparatus grabs frames of image samples from said raster-scanning video camera during said selected frame scan intervals;*

*monitoring the degree of change between frames of image samples grabbed by said frame filling apparatus during successive ones of said selected frame scan intervals; responding to that degree of change being outside a prescribed range to change the frequency of selected ones of said successive frame scan intervals in which to direct x-ray radiation from said gated x-ray source through said living creature, said change in frequency being in a direction tending to reduce the degree of change between frames of image samples grabbed by said frame filling apparatus during successive ones of said selected frame scan intervals; and*

*continuously supplying to said video monitor the frames of image samples generated at said display frame rate by said frame filling apparatus.*

* * * * *